US008424786B2

(12) United States Patent
Ishizaki et al.

(10) Patent No.: US 8,424,786 B2
(45) Date of Patent: Apr. 23, 2013

(54) METHOD FOR PRODUCTION OF PARTICULATE WATER ABSORBENT COMPRISING WATER-ABSORBABLE RESIN AS MAIN INGREDIENT

(75) Inventors: Kunihiko Ishizaki, Himeji (JP); Koji Matsumoto, Himeji (JP); Yoshiro Mitsukami, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 370 days.

(21) Appl. No.: 12/921,946

(22) PCT Filed: Mar. 13, 2009

(86) PCT No.: PCT/JP2009/054905
§ 371 (c)(1),
(2), (4) Date: Sep. 10, 2010

(87) PCT Pub. No.: WO2009/113673
PCT Pub. Date: Sep. 17, 2009

(65) Prior Publication Data
US 2011/0006140 A1   Jan. 13, 2011

(30) Foreign Application Priority Data

Mar. 13, 2008 (JP) .................. 2008-064408
Mar. 28, 2008 (JP) .................. 2008-088072
Apr. 25, 2008 (JP) .................. 2008-115446
Apr. 25, 2008 (JP) .................. 2008-115751
Jul. 18, 2008 (JP) .................. 2008-187904
Sep. 18, 2008 (JP) .................. 2008-238918

(51) Int. Cl.
*B02C 19/00* (2006.01)
(52) U.S. Cl.
USPC .................................. 241/23; 241/25
(58) Field of Classification Search .......... 241/30, 241/29, 23, 25
See application file for complete search history.

(56) References Cited

U.S. PATENT DOCUMENTS

| 4,985,518 | A | 1/1991 | Alexander et al. |
| 6,727,345 | B2 | 4/2004 | Kajikawa et al. |
| 6,817,557 | B2 | 11/2004 | Kakita et al. |
| 7,193,006 | B2 | 3/2007 | Ishizaki et al. |
| 7,347,330 | B2 | 3/2008 | Dairoku et al. |
| 2004/0110006 | A1 | 6/2004 | Ishizaki et al. |
| 2007/0149760 | A1 | 6/2007 | Kadonaga et al. |
| 2008/0227932 | A1 | 9/2008 | Funk et al. |

FOREIGN PATENT DOCUMENTS

| JP | 10-101735 | 4/1998 |
| JP | 10 101735 A | 4/1998 |
| JP | 11-246625 | 9/1999 |
| JP | 11 246625 A | 9/1999 |
| JP | 2005-81204 | 3/2005 |
| JP | 2005 081204 A | 3/2005 |
| WO | WO 2008/123477 | 10/2008 |
| WO | WO 2009/001954 | 12/2008 |

*Primary Examiner* — Mark Rosenbaum
(74) *Attorney, Agent, or Firm* — Occhiuti Rohlicek & Tsao LLP

(57) ABSTRACT

[PROBLEM]
To obtain a particulate water absorbent having excellent and stabilized physical properties.
[SOLUTION]
One example of the production method for particulate water-absorbing agent of the present invention includes a polymerization step for polymerizing a monomer to obtain a polymer gel, a drying step for drying the polymer gel to obtain a particulate water-absorbing resin, a pulverization step for pulverizing the particulate water-absorbing resin, a classification step for sieving the particulate water-absorbing resin, a surface cross-linking step for cross-linking the neighborhood of the surface of the particulate water-absorbing resin to obtain the particulate water-absorbing agent, a packaging step for filling the particulate water-absorbing agent into a packaging material container for packaging, and a transportation step for transporting the products produced in each of the steps to the other steps, wherein at least any one of the steps including and subsequent to the drying step is in two or more lines, for one line of the polymerization step.

21 Claims, 3 Drawing Sheets

METHOD FOR PRODUCTION OF PARTICULATE WATER ABSORBENT COMPRISING WATER-ABSORBABLE RESIN AS MAIN INGREDIENT

CROSS REFERENCE TO RELATED APPLICATIONS

This application is a National Stage of International Application No. PCT/JP2009/054905, filed on Mar. 13, 2009, which claims the priority of Japanese Application No. 2008-064408 filed Mar. 13, 2008, Japanese Application No. 2008-088072 filed Mar. 28, 2008, Japanese Application No. 2008-115446 filed Apr. 25, 2008, Japanese Application No. 2008-115751 filed Apr. 25, 2008, Japanese Application No. 2008-187904 filed Jul. 18, 2008, and Japanese Application No. 2008-238918 filed Sep. 18, 2008. The contents of the prior applications mentioned above is incorporated herein by reference in its entirety.

BACKGROUND OF THE INVENTION

1. Technical Field

The present invention relates to a method for producing a particulate water-absorbing agent composed principally of a water-absorbing resin.

2. Background Art

In recent years, in hygiene products such as disposable diapers, sanitary napkins and incontinent pads, the water-absorbing resin as a composition material thereof has been widely used, as a water-absorbent agent, in view of absorbing a body liquid. As such a water-absorbing resin, for example, there have been known a cross-linked product of partially neutralized polyacrylic acid, a hydrolysate of a starch-acrylic acid graft polymer, a saponified product of a vinyl acetate-acrylate ester copolymer, a hydrolysate of an acrylonitrile copolymer or an acrylamide copolymer and a cross-linked product thereof, and a cross-linked product of a cationic monomer and the like. This water-absorbing resin may be used after converted to also a sheet-like, fiber-like or film-like form, however, it is generally used in a water-absorbing agent after converted to a powder-like form (particulate). As such powders (particles), for example, the particulate water-absorbing agent, having a weight average particle diameter thereof of 200 to 800 μm, is widely used. The particulate water-absorbing agent is produced via many steps. These steps may include the polymerization step, the drying step, the pulverization step, the classification step, the surface cross-linking step, and the like.

The particulate water-absorbing agent has been produced under control of various parameter properties (for example, absorbency, absorbency against pressure, water absorbing speed, liquid permeation, gel stability and the like), as specifications, depending on intended use (for example, disposable diapers, sanitary napkins and the like). However, in a large scale continuous production of the particulate water-absorbing agent, enhancement of productivity thereof, enhancement of property and stabilization of property are difficult, and a small deflection of property may incur property decrease of a final product (for example, disposable diapers and the like) or consumer claims. Maintaining of high property and stable continuous operation have been big problems. In order to solve these problems, Patent Document 2 has disclosed a method for removing the water-absorbing resin having property out of the range of the upper and lower limits, and mixing them again. Patent Document 3 and 4 has disclosed technology of using a plurality of hoppers in an intermediate step or a polymerization step. In addition, Patent Document 5 has disclosed a method for performing polymerization in two lines, and the latter half in one line. Furthermore, many proposals have been provided on technology for enhancement and stabilization of property of the particulate water-absorbing agent, by changing or furnishing a new intermediate production step, in Patent Documents 2 to 4 or the like, as well as Patent Document 1, or by using in combination of a plurality of production apparatuses in Patent Documents 4, 6 to 8 or the like, however, there was sufficient room left to be improved.

In addition, technology of removing and recycling fine powders again, after surface cross-linking for property enhancement, has been proposed in Patent Document 9 or the like, however, removal of the fine powders has a problem of decrease in yield.

PRIOR DOCUMENTS

Patent Documents

Patent Document 1: U.S. Pat. No. 6,817,557
Patent Document 2: U.S. Pat. No. 7,193,006
Patent Document 3: U.S. Pat. No. 6,727,345
Patent Document 4: U.S. Pat. No. 4,985,518
Patent Document 5: WO2007/023097 pamphlet
Patent Document 6: US-A-2007-149760
Patent Document 7: WO2009/001954 pamphlet
Patent Document 8: WO2008/123477 pamphlet
Patent Document 9: U.S. Pat. No. 7,347,330

SUMMARY OF THE INVENTION

Problem to be Solved by the Invention

The present inventors have intensively studied a way to solve the problems and as a result, found that branching of each step as appropriate largely influences enhancement and stabilization of property. In particular, in the pulverization step or the classification step, a large degree of property decrease or deflection is brought about in the particulate water-absorbing agent obtained finally, depending on a control method for continuous production, which may be a cause of property decrease of a final product (for example, disposable diapers and the like) or consumer claims, and thus have completed the present invention.

It is an object of the present invention to provide a production method for the particulate water-absorbing agent, which can contribute to property enhancement and property stabilization in a large scale continuous production, and further contributing to improvement of productivity or the like.

Means for Solving the Problem

The method for producing the particulate water-absorbing agent of the present invention includes:
a polymerization step for polymerizing a monomer to obtain a polymer gel;
a drying step for drying the polymer gel to obtain a particulate water-absorbing resin;
a pulverization step for pulverizing the particulate water-absorbing resin;
a classification step for sieving the particulate water-absorbing resin;
a surface cross-linking step for cross-linking the neighborhood of the surface of the particulate water-absorbing resin to obtain a particulate water-absorbing agent;

a packaging step for filling the particulate water-absorbing agent into a packaging material container for packaging; and a transportation step for transporting the products produced in each of the steps to the other steps;

wherein at least anyone of the steps including and subsequent to the drying step is in two or more lines, for one line of the polymerization step.

Preferably, the pulverization step is in two or more lines, for one line of the polymerization step.

Preferably, the classification step is in two or more lines, for one line of the polymerization step.

Preferably, the steps from the polymerization step to before the pulverization step are in one line, while the pulverization step and the classification step are in two or more lines, for the one line.

Preferably, further comprising a storing step, the water-absorbing resin via the branched plural lines is collected in the storing step to become in one line.

Preferably, the storing step is performed at a temperature in the range of 40 to 150° C.

Preferably, two or more cycles are performed, where a step in one line is branched to plural lines and then becomes in one line.

Preferably, the production amount of the particulate water-absorbing agent is equal to or more than 500 kg/h.

Preferably, two or more units of the same apparatus are installed in parallel in the steps including and subsequent to the drying step, for one unit of a polymerization apparatus.

Preferably, the surface cross-linking step is in two or more lines, for one line of the polymerization step.

Preferably, all of the pulverization step, the classification step and the surface cross-linking step are in two or more lines, for one line of the polymerization step.

Preferably, a division step of the particulate water-absorbing resin is comprised.

Preferably, the division step for dividing the particulate water-absorbing resin to two portions in a ratio of 6:4 to 4:6, is comprised.

Preferably, the particulate water-absorbing resin is divided after storage into a hopper.

Preferably, the particulate water-absorbing resin is divided at free fall.

Preferably, the particulate water-absorbing resin is divided at transporting to a plurality of hoppers by pneumatic transportation.

Preferably, a division step for dividing the polymer gel obtained in the polymerization step to two portions in a ratio of 6:4 to 4:6, is comprised.

Preferably, the polymer gel obtained in the polymerization step is dried after being divided to two portions by free fall or a feeder.

Preferably, the particle of the particulate water-absorbing resin is an irregular crushed particle, and said particulate water-absorbing resin is a polyacrylic acid (salt)-based water-absorbing resin.

Preferably, continuous kneader polymerization or continuous belt polymerization is performed in the polymerization step.

Preferably, the surface cross-linking step is performed using a surface cross-linking agent having dehydration esterification reactivity, of one or more kinds selected from an oxazolidinone compound, an alkylene carbonate compound, a polyvalent alcohol compound, and an oxetane compound, at a temperature in the range of 150 to 250° C.

Preferably, the particulate water-absorbing agent has properties of CRC: 10 to 100 g/g, AAP: 15 to 50 g/g, SFC: equal to or higher than 1 (unit: $10^{-7} \cdot cm^3 \cdot s \cdot g^{-1}$), and the amount of fine powders with a particle diameter of below 150 μm: 0 to 5% by weight.

Advantages of the Invention

In the present invention, at least any one of the steps including and subsequent to the drying step is in two or more lines, for one line of the polymerization step, and thereby, enhancement of property and stabilization of property of the particulate water-absorbing agent is brought in.

BEST MODE FOR CARRYING OUT THE INVENTION

Figure 1:
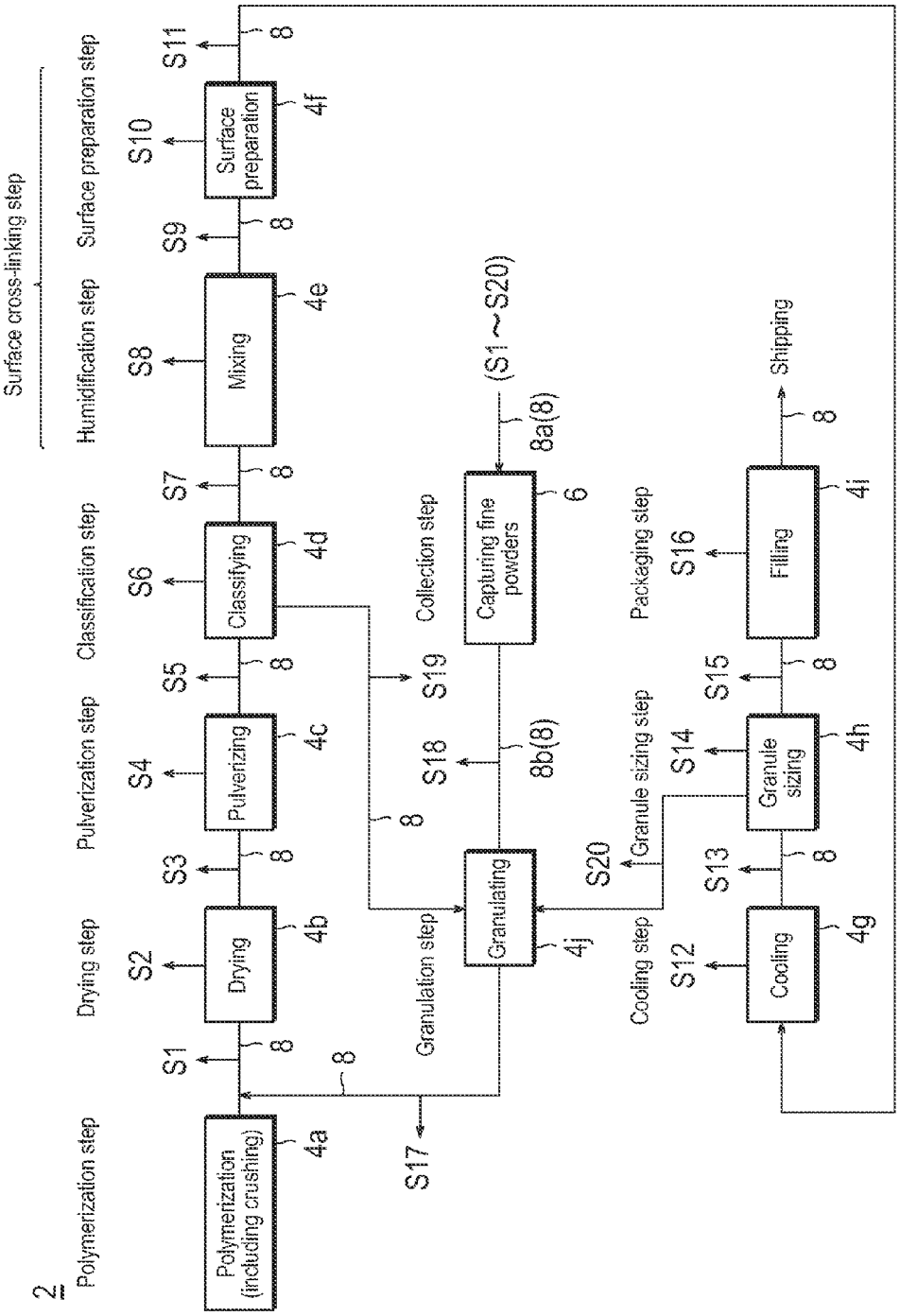
FIG. 1 is a schematic configuration drawing showing production facility to be used to produce the particulate water-absorbing agent by the production method of the present invention.

In the present invention, it has been acquired novel knowledge that by setting at least any one of the steps including and subsequent to the drying step in two or more lines, for one line of the polymerization step, property of the particulate water-absorbing agent is enhanced. In particular, it has been clarified that the effect becomes high, by setting the pulverization step or the classification step in two or more lines (the pulverization step or the classification step in parallel), and/or by setting the surface cross-linking in two or more lines.

Explanations will be given below in detail on the method for producing the particulate water-absorbing agent composed principally of the water-absorbing resin of the present invention, however, scope of the present invention should not be restricted to these explanations, and embodiments other than the following exemplifications may be performed by appropriate changes within a range not to impair the gist of the present invention.

(1) Definition of Terms
(a) "The Water-Absorbing Resin"

In the present description, "the water-absorbing resin" means a water swelling and water insoluble polymer gelling agent, and one having the following properties. That is, it means a polymer gelling agent having an absorbency (CRC/specified in Example) of essentially equal to or higher than 5 g/g, preferably 10 to 100 g/g, and further preferably 20 to 80 g/g, and in addition, solubility in water (specified in extractable/ERT450.2-02 (2002)) of essentially 0 to 50% by weight, preferably 0 to 30% by weight, further preferably 0 to 20% by weight, and particularly preferably 0 to 10% by weight. It should be noted that, said water-absorbing resin is not limited to a form where whole amount (100%) is a polymer, and may include additives and the like to be described later, in a range to maintain the performance.

(b) "Polyacrylic Acid (Salt)"

In the present description, "polyacrylic acid (salt)" means a polymer having acrylic acid (salt) as a principal component, as a repeating unit. Specifically, it means a polymer containing acrylic acid (salt) essentially in 50 to 100% by mole, preferably 70 to 100% by mole, further preferably 90 to 100% by mole, particularly preferably substantially 100% by mole, as a monomer excluding a cross-linking agent. The salt as the polymer contains essentially a water-soluble salt, and is preferably a monovalent salt, and further preferably an alkali metal salt or an ammonium salt. Among them, the alkali metal salt is particularly preferable, and further a sodium salt is preferable.

(c) "The Water-Absorbing Agent"

In the present description, "the water-absorbing agent" means a gelling agent of aqueous liquid, having the water-absorbing resin as a principal component. It should be noted that, the aqueous liquid is not limited to water, and may be urine, blood, feces, waste liquid, moisture or steam, ice, a mixture of water and organic solvent and/or a mixture of water and inorganic solvent, rain water, underground water or the like, and not especially limited as long as it contains water. Among them, as the aqueous liquid, more preferably urine, in particular human urine is included. Content of the water-absorbing resin (polyacrylic acid (salt)-based water-absorbing resin) of the present invention is preferably 70 to 99.9% by weight, more preferably 80 to 99.7% by weight, and further preferably 90 to 99.5% by weight relative to total amount of the water-absorbing agent. As components other than the water-absorbing resin, in view of water absorbing speed or impact resistance of powders (particles), water is preferable and the additives to be described later are contained, as needed.

(d) "EDANA" and "ERT"

"EDANA" is an abbreviation of European Disposables and Nonwovens Association, and "ERT" is an abbreviation of the measurement method (ERT/EDANA Recommended Test Methods) for the water-absorbing resin of an European standard (nearly a world standard). In the present description, unless otherwise specified, the ERT original (known document: revised in 2002) is referred to in measuring properties of the water-absorbing resin.

(e) "The Particle"

In the present description, "the particle" means a solid having fluidity of a particle diameter of equal to or smaller than 5 mm, specified by sieve classification. Water content is not especially limited as long as it is a solid, however, usually it is below 30% by weight, and further preferably equal to or less than 20% by weight. In addition, the lower limit of the particle diameter is, for example, 1 nm. Further, it may be enough to have a certain fluidity as powders, for example, it means a solid whose Flow Rate (ERT450.2-02) can be measured, or a solid which can be sieve classified by (ERT420.2-02). Shape of the solid is not especially limited, and includes irregular crushed particles, spherical-shape, nearly spherical-shape, or a granulated substance (aggregated substance) thereof, however, preferably irregular crushed particles are included.

(f) The Line

In the present description, "the line" means, as specified below, one line proceeding every passing the step, from a raw material (monomer) to obtaining a polymer gel, the water-absorbing resin (including a recovered product of the fine powders), the particulate water-absorbing agent and a final product. The case where the line branches to two, it is referred to as "two lines".

It should be noted that, in the present description, "X to Y" showing a range indicates to be equal to or higher than X and equal to or lower than X. In addition, "1 ton (t)" showing weight (mass) indicates to "1 Metric Ton". Further, in the present description, "mass" and "weight", "% by mass" and "% by weight", "parts by mass" and "parts by weight" are synonymous words, respectively, and measurements of property or the like should be performed at room temperature (20 to 25° C.) and in a relative humidity of 40 to 50%, unless otherwise specified.

(2) The Production Method for the Particulate Water-Absorbing Agent

FIG. 1 is a schematic configuration drawing showing one example of production facility 2 for the particulate water-absorbing agent composed principally of the water-absorbing resin of one embodiment of the present invention. The production step of the present embodiment includes the polymerization step (including the crushing step), the drying step, the pulverization step, the classification step, the surface cross-linking step, the cooling step, the granule sizing step, and the packaging step. It should be noted that, in the embodiment shown in FIG. 1, the surface cross-linking step is composed of a mixing step for mixing a water-absorbing resin and a surface cross-linking agent or a monomer, and a surface treatment step for performing heating treatment and/or irradiation treatment of activated energy rays such as UV rays (hereafter, the latter may also be referred to as "UV treatment"). In this case, when the water-absorbing resin and the monomer were mixed in the mixing step, the UV treatment is performed in the surface treatment step. Further, this production method includes the transportation step for transporting a product produced in each of the steps to the next step. All of these steps are not necessarily essential. The present invention includes at least the polymerization step, the drying step, the pulverization step, the classification step, the surface cross-linking step, the granule sizing step and the transportation step.

The production facility 2 shown in FIG. 1 is provided with a polymerization apparatus 4a where the polymerization step (and the crushing step for crushing the polymer gel obtained in the polymerization step) is performed, a drying apparatus 4b where the drying step is performed, a pulverization apparatus 4c where the pulverization step is performed, a classification apparatus 4d where the classification step is performed, a mixing apparatus 4e where the mixing step is performed, a surface treatment apparatus 4f where the surface treatment step is performed, a cooling apparatus 4g where the cooling step is performed, a granule sizing apparatus 4h where the granule sizing step is performed, and a filling apparatus 4i where the packaging step is performed. Further, the production facility 2 is provided with a fine-powder capturing apparatus 6 for performing a collection step for collecting the fine powders. In this production facility 2, each of these apparatuses is connected by a pipeline 8. This production facility 2 can produce the particulate water-absorbing agent continuously. Further in this production facility 2, a granulation apparatus 4j where the granulation step is performed, is installed. In this case, "the granulation step" means the step for granulating the fine powders obtained (recovered) by the classification step, the granule sizing step and the collection step, to introduce to the drying step again.

[The Two or More Lines]

In the production method for the present invention, at least any one of the steps including and subsequent to the drying step is in two or more lines, for one line of the polymerization step. In the present invention, "the one line" means one line proceeding every passing the step, from a raw material (monomer) to obtaining a polymer gel, the water-absorbing resin (including a recovered product of the fine powders), the particulate water-absorbing agent and a final product. The case where the line branches to two, it is referred to as "two lines". In other word, "the two or more lines" indicate an embodiment where two or more units of the apparatuses are arranged in parallel in the same step to be operated at the same time or alternately.

In this case, "at the same time" indicates a state that the two or more units of the substantially same apparatuses are operated in parallel, and "alternately" indicates a state that termination and operation of one apparatus and the other apparatus are repeated alternately. In the present invention, it has been found that, by operating an apparatus in two or more lines, property of the water-absorbing agent is enhanced. In the present invention, it is preferable that for one unit of a polymerization apparatus, two or more units of the same apparatuses (in particular, two units of the apparatuses) are operated at the same time in parallel.

For example, in supplying the polymer gel to the drying step, an embodiment that the polymer gel discharged from one unit of the polymerization apparatus is branched to the two units of band dryers for drying can be said that the drying step is in two lines. And, property of an intermediate product in this case can be measured as a representative value by calculating average value by sampling from each system of the two or more lines.

In the case where each step is set in two or more lines, in the present invention, for each of the steps, the upper limit is about ten lines, and among them, two to four lines are preferable, two to three lines are further preferable and two lines are particularly preferable. In addition, the upper limit is about 10 lines. By setting the line number in this range, property of the resultant water-absorbing agent is enhanced. When the line (division) number is many, effect by division cannot be obtained, as well as operation becomes complicated, and in view of being uneconomical in cost, two lines is particularly preferable, that is, the two or more units of the same apparatuses (in particular, the two units of the apparatuses) are operated at the same time in parallel.

In addition, in the present invention, the polymer gel or the water-absorbing resin, which is a dried substance thereof, is divided in two or more lines in the step including and subsequent to the drying step, and ratio of amount of division thereof may be determined every steps, and is not especially limited. For example, in performing two-division, 4:6 to 6:4 is preferable, 4.5:5.5 to 5.5:4.5 is more preferable, 4.8:5.2 to 5.2:4.8 is further preferable, and 5:5 is most preferable. Even in the case of three or more lines, it is preferable that ratio of the maximal amount and the minimal amount, to be divided to n, is within the above range. It should be noted that, division operation may be a continuous type or a batch type, and ratio of the division amount is specified by average amount in predetermined time.

[Apparatuses in Parallel]

That is, in the present invention, two or more units of the same apparatuses are installed in parallel at the steps including and subsequent to the drying step, for one unit of a polymerization apparatus.

In the present invention, as the steps including and subsequent to the polymerization step, there are the drying step, the pulverization step, the classification step, the surface cross-linking step, the packaging step, the transportation step and the like, and each contains the drying apparatus, the pulverization apparatus, the classification apparatus, the surface cross-linking apparatus (a mixing apparatus, a heating treatment apparatus, a cooling apparatus of a cross-linking agent), the packaging apparatus (of the polymer gel or a dried polymer), the transportation apparatus and the like, however, it is preferable that the apparatuses are installed in parallel at any of these steps, for one unit of a polymerization apparatus, and for example, it is further preferable that equal to or less than ten units of, preferably two to four units of the apparatuses are installed in parallel, and it is particularly preferable that 2 units of the apparatuses are installed in parallel. In addition, the step where the apparatuses are arranged in parallel is not especially limited, however, the pulverization step, further the classification step and/or the surface cross-linking step are preferable, and the surface cross-linking step is particularly preferable.

In addition, in the present invention, when a plurality of apparatuses is installed in parallel instead of one apparatus, the apparatuses in parallel may be reduced in size as appropriate. Although price of an apparatus is not halved even by downsizing treatment capability of the apparatus to ½, in the present invention, it has been found that by installing a specific apparatus in parallel, property of the resultant water-absorbing agent is enhanced, and ratio of out of specifications decreases, resulting in leading to cost down.

It should be noted that, the Patent Document 5 has disclosed a method for performing "polymerization in two lines", and the latter half in one line, the Patent Document 6 has disclosed technology for "connecting in series" the stirring drying apparatus and the heating treatment apparatus, respectively, as well as the Patent Document 7 has disclosed technology for "connecting in series" the belt polymerization apparatus. On the other hand, in the present invention, by "arranging (substantially the same) apparatuses in parallel" in a specific step after completion of the polymerization step, for one unit of the polymerization apparatus, property enhancement and property stabilization can be attained more than conventional technology.

Explanation will be given below in detail on each step.

[The Polymerization Step]

The polymerization step is the step for polymerizing a monomer, which can become the water-absorbing resin by polymerization, to generate a polymer gel. A polymerization method used in the production method for the present invention is not especially limited, and for example, bulk polymerization, precipitation polymerization, aqueous solution polymerization, reversed phase suspension polymerization or the like is included. It is preferable aqueous solution polymerization (belt polymerization, kneader polymerization) in which monomer as being aqueous solution can be used, or reversed phase suspension polymerization in view of performance and easiness of polymerization control.

The monomer is not especially limited, however, for example, one shown below is included: for example, an anionic unsaturated monomer and a salt thereof such as (meth)acrylic acid, maleic acid (anhydride), itaconic acid, cinnamic acid, vinyl sulfonic acid, allyltoluene sulfonic acid, vinyltoluene sulfonic acid, styrene sulfonic acid, 2-(meth)acrylamido-2-methylpropane sulfonic acid, 2-(meth)acryloylethane sulfonic acid, 2-(meth)acryloylpropane sulfonic acid, 2-hydroxyethyl(meth)acryloyl phosphate, or the like; a mercapto group-containing unsaturated monomer; a phenolic hydroxy group-containing unsaturated monomer; an amide group-containing unsaturated monomer such as (meth)acrylamide, N-ethyl(meth)acrylamide, N,N-dimethyl(meth)acrylamide; or the like; an amino group-containing unsaturated monomer such as N,N-dimethylaminoethyl(meth)acrylate, N,N-dimethylaminopropyl(meth)acrylate, N,N-dimethylaminopropyl(meth)acrylamide or the like. These monomers may be used alone or more kinds may be used in combination as appropriate. In view of performance and cost of the resultant water-absorbing resin, a polyacrylic acid (salt)-based water-absorbing resin is preferable, therefore, it is preferable to use acrylic acid and/or a salt thereof (for example, a salt of sodium, lithium, potassium, ammonium, amines or the like, and among these the sodium salt is preferable in view of cost), as a principal component. Use amount of acrylic acid and/or the salt thereof is preferably equal to or more than 70% by mole, more preferably equal to or more than 80% by mole, further preferably equal to or more than 90% by mole, and particularly preferably equal to or more than 95% by mole (100% by mole is upper limited) relative to total monomer components (excluding an internal cross-linking agent to be described later). It should be noted that, when the monomer is an acid group-containing monomer, neutralization rate thereof is not especially limited, and the polymer gel may be neutralized after polymerization, as needed. In applications where there may be contact to a human body, such as hygiene goods, neutralization after polymerization is not necessary. The neutralization rate of this polymer is preferably from 40 to 90% by mole, and more preferably from 50 to 80% by mole.

When the above-described monomer is used as an aqueous solution in the polymerization step, concentration of the monomer in the aqueous solution (hereafter may also be referred to as "a monomer solution".) is not especially limited, however, within the range of 10 to 70% by weight is preferable, and within the range of 20 to 60% by weight is further preferable. In addition, when the aqueous solution polymerization or reversed phase suspension polymerization is performed, a solvent other than water may be used in combination, as needed. It should be noted that, kind of the solvent to be used in combination is not especially limited.

In the polymerization step, for example, a radical polymerization initiator may be used. This radical polymerization initiator is not especially limited, and one or more kinds may be selected and used from those utilized in polymerization of the usual water-absorbing resin, depending on kind of the monomer to be polymerized, polymerization conditions and the like. For example, a thermal decomposition-type initiator (for example, a persulfate such as a sodium persulfate, a potassium persulfate, an ammonium persulfate; a peroxide such as a hydrogen peroxide, a t-butylperoxide, a methyl ethyl ketone peroxide; an azo compound such as an azonitrile compound, an azoamidine compound, a cyclic azoamidine compound, an azoamide compound, an alkylazo compound, 2,2'-azobis(2-amidinopropane)dihydrochloride, 2,2'-azobis[2-(2-imidazolin-2-yl)propane]dihydrochloride; and the like) or a photodecomposition-type initiator (for example, a benzoin derivative, a benzyl derivative, an acetophenone derivative, a benzophenone derivative, an azo compound or the like); and the like may be included. Among these, in view of cost and reduction capability of residual monomer, the thermal decomposition type initiator is preferable, and a persulfate is particularly preferable. In addition, because combined use of a reducing agent can promote decomposition of the radical polymerization initiator, it is possible to make a redox-type initiator by combining both. The reducing agent is not especially limited, however, for example, (bi)sulfite (salt) such as sodium sulfite, sodium hydrogen sulfite, L-ascorbate (salt), a reductive metal (salt) such as ferrous salt, amines, or the like is included. More preferable one is combined use of the photodecomposition-type initiator and the thermal decomposition-type initiator. Use amount of the radical polymerization initiator to be used in the above-described polymerization step is not especially limited, however, usually 0.001 to 2% by weight is preferable, and 0.01 to 0.5% by weight is more preferable relative to use amount of the monomer. The use amount of the radical polymerization initiator of below 0.001% by weight relative to use amount of the monomer, increases the unreacted monomer, and increases amount of residual monomers in the resultant water-absorbing resin, and is thus not preferable. On the other hand, the use amount of over 2% by weight increases water-soluble components in the resultant water-absorbing resin, and is thus not preferable. It should be noted that, in this polymerization step, instead of the above-described radical polymerization initiator, the monomer may be polymerized by irradiation of activated energy rays such as radiation rays, electron beams, UV rays.

In the polymerization step, an internal cross-linking agent may be used, as needed. As the internal cross-linking agent, a conventionally known internal cross-linking agent, having two or more polymerizable unsaturated groups or two or more reactive groups, in one molecule, is included. Specifically, for example, N,N'-methylenebis(meth)acrylamide, (poly)ethylene glycol di(meth)acrylate, (poly)propylene glycol di(meth)acrylate, trimethylolpropane tri(meth)acrylate, glycerin tri(meth)acrylate, glycerin acrylate methacrylate, ethylene oxide modified trimethylolpropane tri(meth)acrylate, pentaerythritol hexa(meth)acrylate, triallyl cyanurate, triallyl isocyanurate, triallyl phosphate, triallyl amine, polyallyoxy alkane, (poly)ethylene glycol diglycidyl ether, glecerol diglycidyl ether, ethylene glycol, polyethylene glycol, propylene glycol, glycerin, 1,4-butanediol, pentaerythritol, ethylene diamine, ethylene carbonate, propylene carbonate, polyethylene imine, glycidyl(meth)acrylate or the like is include. Among these, in consideration of reactivity, one or more kinds may be used. In particular, as the internal cross-linking agent, a compound having two or more polymerizable unsaturated groups is preferable. Use amount of the internal cross-linking agent may be determined as appropriate by desired property of the water-absorbing resin, however, usually use amount of the internal cross-linking agent may be in the range of 0.001 to 5% by mole, preferably 0.005 to 1% by mole, relative to the monomer. Too low use amount of the internal cross-linking agent tends to decrease strength of the polymer gel and increase soluble content, on the contrary, too much use amount tends to decrease property such as absorbency. It should be noted that, the internal cross-linking agent may be added to a reaction system once as a whole, or may be added dividedly.

In the polymerization step, further as needed, various foaming agents such as a carbonate (hydrogen) salt, carbon dioxide, an azo compound, an inert organic solvent; a hydrophilic polymer such as starch-cellulose, a derivative of starch-cellulose, polyvinyl alcohol, polyacrylic acid (salt), a cross-linked substance of polyacrylic acid (salt); various surfactants; a chain transfer agent such as hypophosphorous acid (salt); or the like, may be added to the reaction system, as appropriate, within a range not to impair effect of the present invention (for example, the various foaming agents is over 0 part by weight to in equal to or lower than 30 parts by weight, the hydrophilic polymer is 0 part by weight to in equal to or lower than 30 parts by weight, and the chain transfer agent is 0 parts by weight to in equal to or lower than 1 part by weight relative to 100 parts by weight of the monomer).

Polymerization temperature in the polymerization step is not especially limited, however, setting at usually 10 to 140° C. is preferable. The polymerization temperature below 10° C. not only lengthens polymerization time and decreases productivity but also could decrease property of the water-absorbing resin. On the other hand, the polymerization temperature over 140° C. could decrease property of the water-absorbing resin. Polymerization time is also not especially limited, and may be determined as appropriate depending on kinds of the monomers and the polymerization initiator, polymerization temperature, or the like. In addition, the above-described polymerization is performed usually under normal pressure, in view of easiness of the apparatus and the operation, however, in order to decrease boiling point in polymerization system, it is also a preferable embodiment that this polymerization is performed under reduced pressure.

As the polymerization method, in view of performance and easiness of polymerization control, for example, after mixing sodium persulfate as the thermal decomposition-type initiator and L-ascorbic acid as the reducing agent, into a monomer solution composed of an aqueous solution of a partial sodium salt of acrylic acid containing polyethylene glycol diacrylate as the internal cross-linking agent, this mixed solution may be supplied to a flat plane steel belt having a weir at the side, and aqueous solution polymerization may be performed continuously on this belt. Such a polymerization method is called belt polymerization. As a polymerization method other than this belt polymerization, continuous kneader polymerization described in Example 1 of U.S. Pat. No. 6,867,269 specification may be used. The water-absorbing resin having desired performance can be obtained in this case as well.

That is, in the polymerization step, continuous kneader polymerization or continuous belt polymerization is used suitably. For such continuous kneader polymerization, for example, technology described in U.S. Pat. No. 6,987,151 specification and U.S. Pat. No. 6,710,141 specification is applied suitably. For the continuous belt polymerization, for example, technology described in U.S. Pat. No. 4,893,999 specification, U.S. Pat. No. 6,241,928 specification, and US-A-2005-215734 specification is applied suitably.

In such a step, irregular crushed particles with high property are obtained in high productivity, however, a problem of property deflection in continuous production, in particular, in continuous production in a giant scale, such a deflection problem is big, however, the present invention can be applied suitably because of enabling to solve such a problem.

In addition, in the continuous kneader polymerization, because segmentalized particulate water-containing gel (for example, 0.1 to 3 mm) is obtained, and the polymer gel can be divided in two easily (that is, in two lines), as well as in the continuous belt polymerization, because sheet-like polymer gel (for example, a width of 0.1 to 5 mm, and a thickness of 0.1 to 20 cm) is obtained, and it can be divided in two easily (that is, in two lines) by cutting, thus it is a polymerization method applicable suitably for the present invention. Division in the drying step is preferably in two divisions, and three or more divisions provide small difference of effect, as well as may provide the case of complicated operation, and thus may provide the case not having economical performance in view of division cost.

[The Drying Step]

The drying step is the step for drying the polymer gel (another name; a water-containing gel-like polymer) obtained in the above-described polymerization step. The polymer gel obtained the polymerization step is preferably supplied to the drying step usually in a particle state of about 0.1 to 5 mm by crushing treatment. Because of being particulate, the polymer gel can be divided easily in two (that is, the drying step in two line), and thus preferable. A drying method in the said drying step is not especially limited, however, a method for using a usual drier and a heating furnace as the drying apparatus 4b may be widely adopted. As drying temperature, setting at relatively high temperature is preferable, specifically 100 to 250° C. is preferable, more preferably 120 to 220° C., and further preferably 150 to 200° C. Drying time is not especially limited, however, it may be set at the time so as to attain desirable solid content rate of the resultant dried substance. It is preferable that solid content rate of the dried substance obtained in the drying step (specified as reduced amount after heating at 180° C. for 3 hours) is equal to or higher than 90% by weight, in view of easiness of pulverization. In general, in view of production efficiency, it is preferable that the drying time is usually within two hours, although it depends on particle diameter of the polymer gel, drying temperature, air volume or the like. As a drying method, various methods are applicable, such as azeotropic dehydration using a hydrophobic organic solvent, infrared ray drying, microwave drying, hot air drying, stirring drying, through-flow band drying and the like, however, in view of productivity and property, through-flow band drying is applied suitably. It was observed that, even in such through-flow band drying, increase in a production scale also tended to decrease property, however, in the present invention, such a problem can be solved, therefore, the through-flow band drying can be applied suitably.

When drying is in two lines in the present invention, the dryers are installed in parallel, and the polymer gel is divided in two, and then dried with each dryer in parallel. Using such a method, also property after drying can be enhanced.

In the present invention, because the polymer gel can be dried efficiently by branching the drying step in two to ten lines, productivity can be enhanced. In the case of division, preferably, in view of easiness of division, the step is included for dividing the particulate water-containing gel after polymerization in a particulate water-containing state, in a ratio of 6:4 to 4:6. In addition, increase in the solid content by drying tends to generate the fine powders or powder dust easily by pulverization, however, the present invention can be applied suitably in drying under condition of high temperature and high solid content because of enabling to solve such a problem.

[The Pulverization Step]

The pulverization step is the step for pulverizing a polymer gel or a dried substance thereof. Pulverization is usually performed for a dried substance of the polymer gel obtained in the drying step, however, it may be performed for the polymer gel obtained in the polymerization step before drying. By this pulverization, the particulate water-absorbing resin as the pulverized substance is obtained. Pulverization is preferably performed so that the particulate water-absorbing resin with desired particle diameter (preferably, a weight average particle diameter of 200 to 800 μm, in particular preferably, a weight average particle diameter of 300 to 600 μm) can be obtained as many as possible. A method for pulverization is not especially limited, and a conventionally known method can be adopted. Because of generation of the fine powders by this pulverization, the fine powders are included in the particulate water-absorbing resin obtained in the pulverization step.

In the present invention, because the polymer gel or the dried substance thereof can be pulverized efficiently by branching the pulverization step in two to ten lines, water absorbing performance (in particular, liquid permeation) of the particulate water-absorbing agent as a final product, can be enhanced.

Particles of the water-absorbing resin or the water-absorbing agent obtained by passing the pulverization step becomes irregular crushed particles, however, such a shape is preferable due to providing large specific surface area, and makes fixing to pulp easy as well. That is, it is preferable that shape of the water-absorbing resin or the water-absorbing agent is an irregular crushed particle. In addition, in the pulverization step, the fine powders or powder dust easily generate, however, the present invention can be applied preferably due to enabling to solve such a problem.

As a pulverization method, the dried substance is pulverized and classified for particle diameter control. As for these methods, for example, it has been described in US-A-2006/024755.

Among these, in view of particle diameter control, a roll mill or a roll granulator can be used suitably, and pulverization with one-stage, or preferably multi-stage, and further 2 to 5-stage roll mill or a roll granulator can be applied. There was observed tendency that, even in the roll granulator, particle diameter control decreased by increase in a production scale, however, the present invention can be applied preferably due to enabling to solve such a problem.

[The Classification Step]

The classification step is the step for classifying the pulverized substance obtained in the above-described pulverization step. In the classification step, the pulverized substances can be classified. In this classification step, by selecting particles having desired particle diameter (preferably, a weight average particle diameter of 200 to 800 μm), the objective particulate water-absorbing resin can be obtained. A classification method is not especially limited and a conventionally known method can be adopted. It should be noted that, in this classification step, the particulate water-absorbing resin contained as the fine powders in the pulverized substance, may be obtained as a residual substance. The classification methods for the water-absorbing resin are exemplified in U.S. Pat. No. 6,164,455 specification, WO2006/074816, WO2008/037672 pamphlet, WO2008/037673 pamphlet, WO2008/037675 pamphlet, WO2008/123477 pamphlet and the like. Among these, in particular, sieve classification is applied, where the number of the sieves is determined as appropriate in about 2 to 5 stages.

In the present invention, because the pulverized substance can be classified efficiently by branching the classification step in two to ten lines, water absorbing performance (in particular, liquid permeation) of the particulate water-absorbing agent as a final product, can be enhanced.

It should be noted that, in the present description, a product in a stage before being supplied to the surface cross-linking step to be described later, after passing the drying step is referred to as "the (particulate) water-absorbing resin", and a product after passing the surface cross-linking step is referred to as "the (particulate) water-absorbing agent".

[The Surface Cross-Linking Step]

The surface cross-linking step is the step for cross-linking the neighborhood of the surface of the particulate water-absorbing resin obtained in the above-described classification step, using a surface cross-linking agent or monomer, to obtain the particulate water-absorbing agent.

As the surface cross-linking agent to be used in the surface cross-linking step, a conventionally known surface cross-linking agent is used suitably. The surface cross-linking agent includes, for example, a polyhydric alcohol compound such as ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerin, polyglycerin, 2-butene-1,4-diol, 1,4-butanediol, 1,5-pentanediol, 1,6-hexanediol, 1,2-cyclohexanedimethanol, 1,2-cyclohexanediol, trimethylol propane, diethanol amine, triethanol amine, polyoxypropylene, an oxyethylene-oxypropylene block copolymer, pentaerythritol, sorbitol; an epoxy compound such as ethylene glycol diglycidyl ether, polyethylene glycol diglycidyl ether, glycerol polyglycidyl ether, diglycerol polyglycidyl ether, polyglycerol polyglycidyl ether, propylene glycol diglycidyl ether, polypropylene glycol diglycidyl ether, glycidol; a polyvalent amine compound such as ethylenediamine, diethylenetriamine, triethylenetetramine, tetraethylenepentamine, pentaethylenehexamine, polyethyleneimine or an inorganic salt or an organic salt (an aziridinium salt or the like) thereof; a polyvalent isocyanate compound such as 2,4-tolylene diisocyanate, hexamethylene diisocyanate; a polyvalent oxazoline compound such as 1,2-ethylene-bis-oxazoline; an alkylene carbonate compound such as 1,3-dioxolan-2-one, 4-methyl-1,3-dioxolan-2-one, 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 1,3-dioxan-2-one, 4-methyl-1,3-dioxan-2-one, 4,6-dimethyl-1,3-dioxan-2-one, 1,3-dioxopan-2-one; a halo-epoxy compound such as epichlorohydrin, epibromohydrin, α-methylepichlorohydrin; a polyvalent metal compound such as a hydroxide or chloride of zinc, calcium, magnesium, aluminum, iron, zirconium or the like; or the like. Among these surface cross-linking agents, at least one kind of compound selected from a group consisting of a polyhydric alcohol compound, an epoxy compound, a polyvalent amine compound and a salt thereof, an alkylene carbonate compound, are preferable. These surface cross-linking agents may be used alone or, in consideration of reactivity, or more kinds may be used by mixing. It should be noted that, the surface cross-linking step may be performed two or more times in consideration of effect thereof, and in that case, as the surface cross-linking agent to be used in each time, the same one or different one may be used, each other.

That is, in the surface cross-linking step in the present invention, one or more kinds of a surface cross-linking agent having dehydration esterification reactivity, selected from a group consisting of an oxazolidinone compound, an alkylene carbonate compound, a polyvalent alcohol compound, and an oxetane compound are preferably used. In such a surface cross-linking step, the water-absorbing agent with high property is obtained. On the other hand, it is necessary to perform the dehydration esterification reaction under high temperature condition, which decreases water content rate of the resultant water-absorbing agent, therefore the fine powders or powder dust may be by-produced in some cases. On the other hand, the present invention can be applied suitably because of enabling to solve such a problem. Therefore, by using such a surface cross-linking agent, it is preferable that the surface cross-linking step installed in parallel for one unit of the polymerization machine. In this case, by installing the heating treatment machine, the mixing machine and an arbitrary cooling machine in parallel, property of the water-absorbing resin is enhanced.

In addition, as disclosed in U.S. Pat. No. 7,201,941 specification, it is also a preferable embodiment that the particulate water-absorbing resin is surface-treated by irradiation of activated energy rays such as UV rays, after being added with a treatment liquid containing a radically polymerizable compound. In this embodiment, instead of or in addition to the above-described surface cross-linking agent, a monomer is used. As such a monomer, one described above as "a monomer" in the polymerization step may be used similarly, therefore, detailed explanation thereof is abbreviated here.

In the surface cross-linking step, use amount of the above-described surface cross-linking agent or monomer depends on the kind and combination of the surface cross-linking agent/monomer selected, however, use amount from 0.001 part by weight to 10 parts by weight is preferable, and from 0.01 part by weight to 5 parts by weight is more preferable, for 100 parts by weight of solid content of the particulate water-absorbing resin. By using the surface cross-linking agent/monomer in this range, cross-link density of the neighborhood of the surface of the particulate water-absorbing agent can be made higher than that of the inside. The case where the use amount of the surface cross-linking agent/monomer exceeds 10 parts by weight is not only uneconomical but also makes excessive supply of the cross-linking agent for forming an optimal cross-link structure to the particulate water-absorbing resin, and thus is not preferable. On the other hand, the case where the use amount of the surface cross-linking agent/monomer is below 0.001 part by weight does not provide sufficient improvement effect in enhancing performance of absorbency against pressure or the like of the particulate water-absorbing agent, and thus is not preferable.

In the surface cross-linking step, it is preferable to use water as a solvent in mixing the particulate water-absorbing resin and the surface cross-linking agent/monomer. Use amount of water depends on kind of the water-absorbing resin, particle diameter, and water content of the particulate water-absorbing resin or the like, however, use amount over 0 part by weight and equal to or lower than 20 parts by weight is preferable, and use amount within the range of 0.5 to 10 parts by weight is more preferable, relative to 100 parts by weight of solid content of the particulate water-absorbing resin. In mixing the particulate water-absorbing resin and the surface cross-linking agent/monomer, a hydrophilic organic solvent may be used in combination, as needed. In this case, as the hydrophilic organic solvent to be used in combination, for example, lower alcohols such as methyl alcohol, ethyl alcohol, n-propyl alcohol, isopropyl alcohol, n-butyl alcohol, isobutyl alcohol, s-butyl alcohol, t-butyl alcohol; ketones such as acetone; ethers such as dioxane, tetrahydrofuran; amides such as N,N-dimethylformamide; sulfoxides such as dimethylsulfoxide; or the like is included. Use amount of the hydrophilic organic solvent depends on kind of the water-absorbing resin, particle diameter and water content of the particulate water-absorbing resin or the like, however, use amount of equal to or lower than 20 parts by weight is preferable, and use amount within the range of equal to or lower than 10 parts by weight is more preferable, relative to 100 parts by weight of solid content of the particulate water-absorbing resin.

In performing surface cross-linking, the following method is preferable, wherein, after getting the aqueous solution, in which a water and/or a hydrophilic organic solvent and a surface cross-linking agent/monomer has been mixed in advance, and then the solution thereof is mixed by spraying or dropping to the particulate water-absorbing resin, and a method for mixing by spraying is more preferable. Size of a droplet sprayed is preferably within the range of 0.1 to 300 μm, and more preferably within the range of 0.1 to 200 μm, as an average particle diameter.

For mixing the particulate water-absorbing resin with the surface cross-linking agent/monomer, water and hydrophilic organic solvent, the mixing apparatus 4e is used. This mixing apparatus 4e is preferably provided with a large mixing force to mix the both uniformly and surely. As the mixing apparatus 4e, for example, a cylinder-type mixing machine, a double wall cone-type mixing machine, a high speed stirring-type mixing machine, a V-character-type mixing machine, a ribbon-type mixing machine, a screw-type mixing machine, a twin arm-type kneader, a pulverizing-type kneader, a rotation-type mixing machine, an air flow-type mixing machine, Turbulizer, a batch-type Rhedige mixer, a continuous Rhedige mixer or the like is suitable.

That is, in the present invention, by installing the mixing apparatus in parallel in the surface cross-linking step, for one polymerization apparatus, property of the water-absorbing resin is enhanced. As the mixing apparatus, a continuous mixing machine, in particular, a continuous stirring-type mixing machine (for example, Turbulizer, Rhedige mixer or the like) is used suitably.

In the surface cross-linking step, the surface cross-linking reaction can proceed even at room temperature. It should be noted that, in view of promotion of the reaction along with removal of water and solvent added, it is preferable that, after mixing (the mixing step) the particulate water-absorbing resin and the surface cross-linking agent, further heating treatment and/or UV treatment is performed to cross-link the neighborhood of the surface of the particulate water-absorbing resin (this step may also be referred to as "a surface treatment step" in the present description). When a surface cross-linking agent is mixed with the water-absorbing resin in the mixing step, in order to react the surface cross-linking agent at the neighborhood of the surface of the particulate water-absorbing resin, it is preferable to perform heating treatment, in consideration of reactivity of the surface cross-linking agent, simplicity and easiness of the production apparatus, productivity or the like. On the other hand, when UV irradiation is performed by mixing a monomer, the reactivity is high even at room temperature. In said heating treatment, treatment temperature is preferably equal to or higher than 80° C., although it depends on the surface cross-linking agent selected. The treatment temperature of below 80° C. takes longer time in the heating treatment, and thus not only incurs decrease in productivity but also cannot attain uniform surface cross-linking in some cases. In this case, it is worried decrease in absorption characteristics under pressurization of the particulate water-absorbing agent, as well as remaining of the unreacted surface cross-linking agent. The treatment temperature of over 250° C. incurs deterioration of the particulate water-absorbing resin, and decreases performance of the particulate water-absorbing agent obtained by surface cross-linking, and thus is not preferable. From this viewpoint, the treatment temperature (temperature of a heating medium or temperature of a material/in particular, temperature of the heating medium) is preferably in the range of 100 to 250° C., more preferably in the range of 150 to 250° C. (in particular, it is suitable for the surface cross-linking agent having dehydration esterification reactivity). Heating time is preferably in the range of 1 minute to 2 hours. Suitable examples of a combination of heating temperature and heating time are at 180° C. for 0.1 to 1.5 hour; and at 200° C. for 0.1 to 1 hour.

It should be noted that, when UV treatment is performed by adding treatment liquid containing a monomer, treatment time is preferably equal to or longer than 0.1 minute and shorter than 60 minutes, more preferably equal to or longer than 0.5 minute and shorter than 20 minutes, further preferably equal to or longer than 0.5 minute and shorter than 5 minutes, and particularly preferably equal to or longer than 1 minute and shorter than 3 minutes. In performing surface treatment by UV irradiation, heating is not necessary. However, said UV irradiation can be performed also under heating. In this way, the water-absorbing resin superior in water absorbing characteristics can be obtained. Heating temperature is in the range of preferably 0 to 150° C., more preferably 10 to 120° C., further preferably from room temperature to 100° C., and particularly preferably 50 to 100° C. It should be noted that, UV irradiation may generate radiation heat in some cases. In these cases, as a result, UV irradiation is performed under heating.

As the apparatus 4f performing the heating treatment and/or UV treatment, a known dryer or a heating furnace is used. For example, a dryer or a heating furnace of a conductive heat transfer-type dryer, a radiation heat transfer-type dryer, a hot air heat transfer-type dryer, an dielectric heating-type dryer is suitable. Specifically, a dryer or a heating furnace of a belt-type, a groove stirring-type, a screw-type, a rotation-type, a disk-type, a kneading-type, a fluid bed-type, an air flow-type, an infrared ray-type, an electron beam-type is included.

That is, in the present invention, most preferably, the heating treatment apparatuses are installed in parallel at the surface cross-linking step, for one unit of a polymerization apparatuses. In this way, property of the water-absorbing resin is enhanced. As a heating treatment machine, a continuous heating treatment machine, in particular, a continuous conduction heat-conducting-type heating treatment machine (for example, a paddle dryer or the like) is used suitably.

In the surface cross-linking step, the surface cross-linking treatment may be performed in a static state or under stirring. When the surface cross-linking treatment is performed under stirring, the surface cross-linking may be completed by heating the mixture in the mixing apparatus, where the particulate water-absorbing resin and the surface cross-linking agent were mixed, and the surface cross-linking may be completed by heating the mixture, by charging the mixture, for example, into a twin-screw groove-type agitated drying apparatus.

In the present invention, the number of lines of the surface cross-linking step is not especially limited, and arbitrary number may be selected, however, in consideration of plant construction cost, running cost or the like, one line or two lines, in particular, two lines are preferable. That is, in view of property, it is most preferable that all of the pulverization step, the classification step and the surface cross-linking step are in two or more lines (the upper limit is a range described above), for one line of the polymerization step.

[The Cooling Step]

The cooling step is the step performed arbitrary after the surface cross-linking step, and for example, the step for the particulate water-absorbing agent obtained by cross-linking the neighborhood of the surface, by heating in the surface cross-linking step, is cooled before charging to the granule sizing step to be described later. The cooling apparatus 4g to be used in this cooling step is not especially limited, however, it is exemplified in U.S. Pat. No. 6,378,453 specification or the like, and for example, a twin-screw stirring dryer or the like, where cooling water is passed through inside the inner wall or other heat conduction surfaces, may be used. Temperature of this cooling water is set below heating temperature in the surface cross-linking step, and preferably at equal to or higher than 25° C. and lower than 80° C. In the surface cross-linking step, there is the case where surface cross-linking of the particulate water-absorbing resin is performed at room temperature. In this case, because the particulate water-absorbing agent obtained by the surface cross-linking is not heated, this cooling step may not be performed. That is, this cooling step is other step which may be further contained in this production method, as needed.

That is, in the present invention, by installing a cooling apparatus in parallel, which may be installed arbitrary, property of the water-absorbing resin is enhanced. As the cooling apparatus, a cooling apparatus for stirring mixing is used suitably, by combining mechanical stirring (stirring by air flow may be combined) or stirring by vibration, and stirring by air flow, as exemplified in U.S. Pat. No. 6,378,453 specification or the like.

[The Addition Step of Additives]

In the present invention, the addition step for adding additives other than the surface cross-linking agent/monomer may be further installed. This addition step is preferably installed including and subsequent to the polymerization step, and more preferably installed including and subsequent to the drying step. The additives may be added in the cooling step or other steps. As the additives, for example, the following (A) a polyvalent metal salt, (B) an inorganic particle (C) a liquid permeability improver, (D) other additives and the like may be added. By these additions, various functions can be furnished to the particulate water-absorbing agent. Further, the following (E) chelating agent may be added to the particulate water-absorbing agent. In the step for using such additives, the water-absorbing agent with high property can be obtained. On the other hand, the deflection of property is easy to become big, due to increase of steps. In contrast, the present invention can be applied suitably because of enabling to solve such problems.

Use amount of the (A) to (E) in the production method for the present invention, differs depending on objectives and functions to be furnished, however, it is usually, as addition amount of one kind thereof, in a range of 0.001 to 10 parts by mass, preferably 0.001 to 5 parts by mass, and further preferably 0.002 to 3 parts by mass, relative to 100 parts by mass of the water-absorbing resin. Usually, when this addition amount is lower than 0.001 parts by mass, sufficient effect and functions to be furnished by the additives cannot be obtained, and when this addition amount is over 10 parts by mass, effect comparable to the addition amount cannot be obtained or water absorbing performance decreases.

Explanation will be given below in detail on the additives to be used suitably in the present invention.

(A) About the Polyvalent Metal Salt

The polyvalent metal salt may be formulated into the particulate water-absorbing agent obtained by the production method for the present invention, for aiming at enhancing liquid permeability and powder hygroscopic fluidity. Preferable amount of this polyvalent metal salt is as described above. As this polyvalent metal salt, a polyvalent metal salt of an organic acid and a polyvalent metal salt of an inorganic acid are exemplified. As the preferable inorganic polyvalent metal salt, for example, aluminum chloride, poly aluminum chloride, aluminum sulfate, aluminum nitrate, potassium aluminum bissulfate, sodium aluminum bissulfate, potassium alum, ammonium alum, sodium alum, sodium aluminate, calcium chloride, calcium nitrate, magnesium chloride, magnesium sulfate, magnesium nitrate, zinc chloride, zinc sulfate, zinc nitrate, zirconium chloride, zirconium sulfate, zirconium nitrate or the like is included. In addition, in view of solubility with an absorbing liquid such as urine, use of a salt thereof having crystal water is preferable. A particularly preferable one is an aluminum compound. Among this aluminum compound, aluminum chloride, poly aluminum chloride, aluminum sulfate, aluminum nitrate, potassium aluminum bissulfate, sodium aluminum bissulfate, potassium alum, ammonium alum, sodium alum, sodium aluminate are preferable, and aluminum sulfate is particularly preferable. Powders of water-containing crystal such as aluminum sulfate-octadeca hydrate salt, aluminum sulfate-tetradeca to octadeca hydrate salt may be used most suitably. They may be used as only one or two more kinds may be used in combination. In view of handling property and mixing property with the particulate water-absorbing agent, the polyvalent metal salt is used preferably in a solution state, and is used particularly preferably in an aqueous solution state.

In addition, other polyvalent metal salts of organic acids to be used, and mixing methods thereof are exemplified, for example, in U.S. Pat. No. 7,282,262 specification.

(B) About the Inorganic Particle

The inorganic particle, in particular, a water-insoluble inorganic particle can be formulated into the particulate water-absorbing agent obtained by the production method of the present invention in order to prevent blocking in moisture absorption. As the inorganic powder to be used in the present invention, specifically, for example, a metal oxide such as silicon dioxide or titanium oxide; silicic acid (salt) such as natural zeolite or synthetic zeolite; kaolin; talc; clay; bentonite or the like is included. Among these, silicon dioxide and silicic acid (salt) are more preferable, silicon dioxide and silicic acid (salt), having an average particle diameter of 0.001 to 200 μm, measured by the Coulter counter method, is further preferable.

(C) About the Liquid Permeability Improver

The liquid permeability improver means the additive such as a water-insoluble inorganic fine particle, a water-soluble polyvalent metal salt, a water-soluble polymer, polyamine, for enhancing saline flow conductivity (SFC) of the water-absorbing resin or the water-absorbing agent having a saline flow conductivity (SFC) of equal to or higher than 6 ($\times 10^{-7} \cdot cm^3 \cdot s \cdot g^{-1}$) to be described later, by equal to or higher than 10 ($\times 10^{-7} \cdot cm^3 \cdot s \cdot g^{-1}$). Therefore, there is a case where the additives exemplified in the above-described (A) and (B) correspond to this liquid permeability improver as well. In this production method, this liquid permeability improver is preferably a water-soluble polyvalent metal compound or a polycation compound. Specifically, it is preferably a compound of one or more kinds selected from a group consisting of an aluminum compound, a zirconium compound, a titanium compound, and a compound having an amino group. In more specifically, for example, the water-soluble polyvalent metal compound such as aluminum sulfate, potassium alum, ammonium alum, sodium alum, (poly)aluminum chloride and a hydrate thereof; the polymeric polyamine compound, preferably the water-soluble polymeric polyamine, more specifically, the polycation compound such as polyethylenimine, polyvinylamine, polyallylamine, having a weight average molecular weight of 200 to 1000000; the water-insoluble inorganic fine particle such as silica, alumina, bentonite; or the like is included, and they may be used as only one kind, or may be used in two or more kinds in combination. Among these, the water-soluble polyvalent metal salt such as aluminum sulfate, potassium alum or the like is preferable in view of enhancing saline flow conductivity (SFC). In addition, the liquid permeability improver is preferably added as a form of an aqueous solution, in view of easy addition more uniformly to the whole surface of the water-absorbing resin, and no segregation of the liquid permeability improver or the like.

(D) About the Other Additives

To the particulate water-absorbing agent obtained by the production method of the present invention, as needed, for example, a surface-active agent, a disinfectant, an antimicrobial agent, perfume, various inorganic powders, a foaming agent, a pigment, a dye, a hydrophilic staple fiber, a fertilizer, an oxidizing agent, a reducing agent, water-soluble salts, or the like may be added, as appropriate, in a range not to impair effect of the present invention (for example, equal to or less than 30 parts by weight, and further equal to or less than 10 parts by weight, relative to 100 parts by weight of the particulate water-absorbing agent), and by this various functions can be furnished.

(E) About the Chelating Agent

The particulate water-absorbing agent to be used in the present invention may contain the chelating agent. The mixing step of the chelating agent is not especially limited, however, it is preferable that the chelating agent is mixed to the monomer or monomer solution which is used as the raw materials in the polymerization step. As the chelating agent, a polymer chelating agent and a non-polymer chelating agent are exemplified. Preferably the non-polymer chelating agent containing an acid group, and further preferably, the non-polymer chelating agent containing a phosphoric acid group or a carboxylic acid group is used. The number of the acid group contained in this non-polymer chelating agent is 2 to 100, further 2 to 50, and in particular, 2 to 10. As this chelating agent, a non-polymer chelating agent containing nitrogen is used, or a chelating agent containing nitrogen may also be used suitably. Use amount of the chelating agent is preferably from 10 ppm by mass to 1000 ppm by mass, relative to 100 parts by mass of the water-absorbing resin.

The (A) and (C) can be used suitably as a surface treatment agent. The additives in the (B) to (E) and the like, may be added as a form of an aqueous solution or a water dispersion solution, in addition, when said additives are solid, they may be subjected to dry-type mixing to the water-absorbing resin, as powders (preferably having a particle diameter of equal to or smaller than 300 μm). Surface treatment in the present application means that a region of the surface or the neighborhood of the water-absorbing resin has been modified chemically or physically, by the heating treatment and/or irradiation treatment of activated energy rays, in addition, the state where it is covered by the polyhydric alcohol, or it is covered by the water-soluble polyvalent metal salt without chemical bonding, is called the surface-treated state, as well.

In particular, in the present invention, the polyvalent metal salt is preferable as the additives for enhancing liquid permeability. It is preferable that the polyvalent metal salt is mixed after the addition. As an apparatus for mixing, for example, cylinder-type mixing machine, a screw-type mixing machine, a screw-type extruder, Turbulizer, Nauta-type mixing machine, a V-type mixing machine, a ribbon-type mixing machine, a twin arm-type kneader, a fluidized-type mixing machine, an air flow-type mixing machine, rotation disk-type mixing machine, a roll mixer, a rolling-type mixing machine, Rhedige mixer, or the like can be included.

That is, in the addition step of additives in the present invention, it is preferable that the mixing apparatus is installed in parallel for one polymerization apparatus. In this way property of the water-absorbing resin is enhanced. As the mixing apparatus, a continuous mixing apparatus, in particular, a continuous stirring-type mixing machine (for example, Turbulizer, Rhedige mixer or the like) is used suitably. It should be noted that, as the additives, all substances other than the surface cross-linking agent are called the additives collectively, however, the (A) to (C) are used as the additives, in particular, the surface treatment agent. In this description, the surface treatment agent is a generic name of the additives for modifying a surface.

It should be noted that, the polyvalent metal salt is preferably mixed with the water-absorbing resin as an aqueous solution. Size of a droplet of the aqueous solution can be adjusted as appropriate. In view of preventing permeation and diffusion of a polyvalent metal ion (for example, an aluminum ion) into the inside of the water-absorbing resin, the aqueous solution preferably has a concentration of equal to or higher than 50% by mass, more preferably equal to or higher than 60% by mass, further preferably equal to or higher than 70% by mass, further preferably equal to or higher than 80% by mass, and most preferably equal to or higher than 90% by mass, relative to saturated concentration. Naturally, it may be an aqueous solution having the saturated concentration, or a dispersion solution having over the saturated concentration. Temperature of the aqueous solution is adjusted as appropriate in a range of equal to or lower than boiling point to adjust solubility or viscosity, however, mixing is usually performed at about room temperature.

[The Granule Sizing Step]

Irrespective of adjustment of the particle diameter in the above-described pulverization step and classification step, there may be the case where an aggregated substance having large particle diameter is included in the particulate water-absorbing agent after the cooling step. This aggregated substance may be generated principally in mixing the surface cross-linking agent, or in a surface cross-linking reaction. In this granule sizing step, in order to re-adjust the particle size, the crushing treatment and classification treatment of this aggregated substance is performed. The order and number of this crushing treatment and classification treatment, is not especially limited. The granule sizing method has been disclosed in U.S. Pat. No. 7,347,330 specification, US-A-2005-0113252 specification or the like.

In this granule sizing step, for example, firstly the classification treatment is performed for the particulate water-absorbing agent. In this classification treatment, a classification apparatus such as a sieve or an air flow classification machine is used. In this classification treatment, for example, by using a sieve having large sieve mesh size, the aggregated substance having large particle diameter can be obtained. In this way, after the aggregated substance having large particle diameter is removed, by using a sieve having small sieve mesh size, the fine powders having small particle diameter are removed. For the aggregated substance obtained by this classification treatment, the crushing treatment is performed. By this crushing treatment, particles composing the aggregated substance can be crushed and separated to an individual particle, and the particulate water-absorbing agent as a single particle can be obtained. In this crushing treatment, for example, a knife cutter-type crushing machine is used. For the crushed substance obtained by this crushing treatment, the classification treatment is performed again. In this granule sizing step, while the fine powders having small particle diameter are removed, the particulate water-absorbing agent having desired particle diameter (preferably, a weight average particle diameter of 200 to 800 μm) can be obtained. In this production method, an apparatus to be used in this crushing treatment and an apparatus to be used in the classification treatment configure the granule sizing apparatus 4h. It should be noted that, in this granule sizing step, the particulate water-absorbing agent contained as the fine powders may be obtained as a residual substance.

In the present invention, the number of lines of the granule sizing step is not especially limited, and arbitrary number of lines can be selected.

It should be noted that, technology to remove the fine powders (example, smaller than 150 μm) again, after surface cross-linking to enhance property, has also been known. Such removal of the fine powders has also a problem of decreasing in yield or increasing in cost, however, in the present invention, high property can be maintained without removing the fine powders after surface cross-linking.

[The Packaging Step]

The packaging step is the step for filling the particulate water-absorbing agent, which was granule-sized in the above-described granule sizing step, into the packaging material container, and for packaging. For example, in this packaging step, the particulate water-absorbing agent transferred to a hopper is filled into the packaging material container, using the filling apparatus 4i. As for the packaging container, for example, a storage bag such as flexible container is used. In this production method, the particulate water-absorbing agent filled in the storage bag is shipped as a product via the pre-determined inspection.

In the present invention, the number of lines of the packaging step is not especially limited, and arbitrary number of lines can be selected, however, in consideration of plant construction cost or the like, one line is preferable.

[The Transporting Step]

"The transporting step" performed in the production method for the present invention is the step for transporting a product such as the polymer gel, the particulate water-absorbing resin, the particulate water-absorbing agent generated in each of the steps to the other steps. In this transporting step, for example, by controlling pressure in the pipeline 8 which connects each of the apparatuses themselves installed at each of the steps, the product generated in one step is transported to other step. In this production method, the product such as the polymer gel, the particulate water-absorbing resin, the particulate water-absorbing agent is transported for example, by pneumatic transportation. It should be noted that, instead of the pneumatic transportation, a transportation machine such as a conveyor may be used. That is, by connecting the apparatuses to be used at one step and the apparatuses to be used at other step via a transportation machine such as a conveyor, a product generated in one step may be transported to other step. Further in the transporting step, the transportation may be performed by free falling utilizing gravitational force. In addition, the particulate water-containing gel and the water-absorbing resin particle may be divided using a crest or weir at free-falling. The transportation means in the transportation step is selected as appropriate, it is transported by the transportation machine (for example, air transportation apparatus, belt conveyor, screw conveyor, and bucket conveyor and the like) or gravity drop, they are exemplified in WO 2007/104657 pamphlet, WO 2007/104673 pamphlet, and WO 2007/104676 pamphlet In this production method, for example, the polymer gel generated in the polymerization step is transported to the drying apparatus 4b by the transporting step. And, the dried substance of the polymer gel dried in the drying step is transported to the pulverization apparatus 4c, in which the pulverization step is performed, by the transporting step. In addition, the particulate water-absorbing resin obtained in the pulverization step is transported to the classification apparatus 4d, in which the classification step is performed, by the transporting step. Further, the particulate water-absorbing resin sieved in the classification step is transported to the mixing apparatus 4e, in which the mixing step is performed, by the transporting step. In addition, the particulate water-absorbing agent cross-linked at the surface part thereof in the surface cross-linking step is transported to the cooling apparatus 4g, in which the cooling step is performed, by the transporting step. And the particulate water-absorbing agent cooled in the cooling step is transported to the granule sizing apparatus 4h, in which the granule sizing step is performed, by the transporting step. Finally, the particulate water-absorbing agent granule sized in the granule sizing step is transported to the filling apparatus 4i, in which the packaging step is performed, by the transporting step. In this production method, even in the case where the step other than each of the steps is included, it is preferable that a product produced in this other step is transported to each of the steps by the transporting step. According to this production method, the particulate water-absorbing agent can be produced continuously. Each step other than the transporting step may be directly connected, however, it is preferably connected via the transporting step. Accordingly, it is preferable that the transporting steps are present in a number equivalent to the number of the steps other than the transporting steps. From this viewpoint, the number of the transporting step per one polymerization step is preferably equal to or more than 2 in parallel or in series, more preferably equal to or more than 3, more preferably equal to or more than 4, and more preferably equal to or more than 5. The upper limit of the number of the transporting step is determined as appropriate, however, for example, it is set equal to or less than 30, and further equal to or less than 20. Transportation apparatuses to be used in a plurality of the transporting steps may be the same apparatus, or different apparatus. It should be noted that, series transportation is used in transportation from a certain step to other step (example, the surface cross-linking step to the cooling step to the granulation step), and parallel transportation is one where the water-absorbing resin or the polymerized gel is transported to a plurality of apparatuses (for example, the surface cross-linking step in parallel, or the drying step in parallel), and the number of the transportation steps is specified by total number thereof (also in the parallel case, it is specified by total number of the transportation machines in parallel).

[A Storage Step]

In the production method for the present invention, it is preferable to install the storage step for temporarily storing an intermediate product (the particulate water-absorbing resin or the particulate water-absorbing agent), by installing a hopper warmed at equal to or higher than 30° C. to prevent aggregation just after or just before each step and during the transportation step. The water-absorbing resin passed through a plurality of branched lines (apparatuses in parallel) is recovered by, for example, the storage step, and then it is in one line. And, by performing, two or more times, a cycle where the step in one line branches to a plurality of lines (apparatuses in parallel) and then it is in one line, stabilization of property is promoted.

Suitable storage means is a hopper or a silo, and after storing the water-absorbing resin once in the hopper or the silo, it may be transported to a plurality of steps in parallel (for example, preferably the surface cross-linking step) using a plurality of transporting machines in parallel. By storing once, quantitative supply performance to a plurality of apparatuses in parallel is enhanced, and property is more enhanced and stabilized. For discharging from the hopper, a metering feeder such as a screw feeder, a table feeder, is used suitably.

In view of quantitative supply of divisions, it is preferable that the hopper is heated or retained heat, and preferably the inner surface is maintained at about 40 to 100° C., further 45 to 90° C., and particularly 50 to 80° C.

[The Collection Step]

As described above, in the production method for the present invention, the fine powders generate by pulverizing the polymer gel dried in the pulverization step. The fine powders also generate by crushing treatment in the granule sizing step. Further, there may be the case where the fine powders generate by wear or the like of the particulate water-absorbing resin and the particulate water-absorbing agent during transportation in the transporting step. In addition, the fine powders may also generate when the particulate water-absorbing agent receives damage in a process including and subsequent to the heating treatment/UV treatment in the surface cross-linking step. Further, in observing the fine particles captured by an apparatus to be described later, using a scanning electron microscope, an X-ray micro-analyzer or the like, there may be the case where the aggregated substance (dust) of inorganic fine particles, composed of silicon dioxide, having a longer diameter of from 20 to 100 µm, or the like is present mixed in the fine powders. Presence of such an aggregated substance (dust) is caused by the additives and dust in gas. By the collection step used the fine powder capturing apparatus, such an aggregated substance (dust) can be removed. By removing this aggregated substance (dust), work environment can be enhanced. In addition, removal of this aggregated substance (dust) can contribute to enhancement of property of the particulate water-absorbing agent. Preferably, the production method of the present invention includes this collection step.

In this production method, the fine powders can be present in any each of the steps. Specifically, the fine powders may be contained in gas present in each apparatus where each step is performed, and in the pipeline 8. The collection step is the step for collecting the fine powders in gas using the trapping material. As described above, in this collection step, the fine-powder capturing apparatus 6 is used. The fine-powder capturing apparatus 6 has an apparatus which can suction the gas. By making thus suctioned gas pass through the trapping material, the fine powders can be captured. However, an embodiment of the fine-powder capturing apparatus is not necessarily limited to such an embodiment. In this production method, the fine powders are preferably transported to the fine-powder capturing apparatus 6 by the transporting step. The fine-powder capturing apparatus 6 may be used as a single unit, or as two or more units.

The fine powders are those having smaller particle diameter than that of the particulate water-absorbing agent aiming at obtaining by the production method of the present invention, and conventionally, they have been usually treated as waste materials. As will be described later, weight average particle diameter (D50) of the particulate water-absorbing agent (specified by the JIS standard sieve classification) is preferably 200 to 800 µm, and for example, weight average particle diameter (D50) of the particulate water-absorbing agent obtained by the production method of the present invention is preferably 200 to 450 µm. The fine powders are remaining substances after removal so that weight average particle diameter (D50) of the obtained particulate water-absorbing agent becomes within a desired range. Specifically, weight average particle diameter (D50) of the fine powders is in range of 10 to 150 µm. Preferably, it is desirable that the fine powders contain particles having a particle diameter (specified by the JIS standard sieve classification) of practically below 150 µm, in 70 to 100% by weight, further 90 to 100% by weight. In addition, as shape of the fine powders, one with a sphere obtained by reversed phase suspension polymerization, and one with an irregular shape obtained by aqueous solution polymerization are included. Further, the fine powders may be one being performed or not performed of the surface cross-linking treatment, or may be a mixture thereof.

In this production method, this fine-powder capturing apparatus 6 is jointed to the apparatuses used in the each of the steps or any of the pipeline, which connects them, by the pipeline 8a. In the fine-powder capturing apparatus 6 shown in FIG. 1, the pipeline 8a may be connected to any one position between directional lines S1 to S20 in figure, or may be connected to a plurality of positions between the S1 to S20, or may be connected to all of the S1 to S20. This connected position is determined as appropriate in consideration of generation state of the fine powders. By this connection, the fine powders present in any of the steps are transported to this fine-powder capturing apparatus 6 through the pipeline 8a. The pipeline 8a may be branched so as to connectable to a plurality of positions.

In this production method, the fine powders collected with this fine-powder capturing apparatus 6 are exhausted through the pipeline 8b. Preferably, this fine-powder capturing apparatus 6 is connected to the granulation apparatus 4j for performing the granulating step, by the pipeline 8b. Detail of the granulating step will be described later. The granulated substance obtained by granulating the fine powders is jointed to any of the apparatuses to be used in each of the steps, via the pipeline 8. In the fine-powder capturing apparatus 6 shown in FIG. 1, the granulation apparatus 4j is connected to the pipeline 8 which connects the polymerization apparatus 4a and the drying apparatus 4b. In this way, the fine powders granulated in the granulating apparatus 4J are charged to the drying step through the pipeline 8b. In this production method, the fine powders can be reused without being disposed. This reuse may contribute to reduction of production cost.

Further, in this production method, by branching the steps as appropriate, the production efficiency is excellent.

And the particulate water-absorbing agent superior in property such as absorbency against pressure and liquid permeation, can be obtained

[The Granulating Step]

The preferable production method of the present invention includes the granulating step. The granulating step is the step for obtaining the granulated particle by adding an aqueous liquid to the fine powders. The fine powders can be obtained at the classification step, the granule sizing step and the collection step. From the viewpoint of enhancing the recovery rate of the fine powders it is preferable that all of the fine powders collected by the collection step can be supplied to this granulating step. The granulated particle is composed of a plurality of the fine powders. Average particle diameter of the granulated particle is equal to or smaller than 20 mm, preferably 0.3 to 10 mm, and more preferably 0.35 to 5 mm. Preferably, this granulated particle is charged to the drying step, and dried in the co-presence of the polymer gel. As described later, preferably, in this granulating step, the fine powders captured in the collection step, is used.

In this granulating step, it can be confirmed for a granulated substance generated to be the granulated particle from the fact that an individual particle is aggregated by gathering plurality while maintaining shape thereof, or from the fact that it swells as a plurality of discontinuous particles in absorbing a solution, with an optical microscope.

In this granulating step, in view of drying load, the granulated particle has a water content of preferably equal to or lower than 75% by weight, more preferably equal to or lower than 70% by weight, and further preferably equal to or lower than 65% by weight (the lower limit is over 0% by weight, and preferably equal to or higher than 5% by weight). When the water content of the granulated particle is extremely higher than that of the polymer gel, partially incomplete drying could be generated in drying this granulated particle and the polymer gel in a co-present state.

In this granulation step, in view of mixing property with aqueous liquid or drying efficiency, temperature of the fine powders is preferably equal to or higher than 35° C., more preferably 40 to 100° C., and further preferably 45 to 80° C. Temperature of the fine powders may be adjusted as appropriate by warming, heating, cooling or the like at each process of production of particulate water-absorbing agent.

In this granulating step, in a preferable embodiment of the granulation, the heated aqueous liquid and the fine powders are subjected to high speed mixing. High speed mixing means that time for completing mixing of the aqueous liquid and the fine powders, and time till generation of the granulated particle is short time. That is, it means that time from contacting of the aqueous liquid and the fine powders to generation of the granulated particle, in other word, mixing time is short time. Said mixing time is preferably equal to or shorter than 3 minutes, more preferably equal to or shorter than 1 minute, and 1 to 60 seconds is most preferable. When mixing time is long, uniform mixing of the aqueous liquid and the fine powders becomes difficult, and it tends to provide the unified giant gel-like substance. In addition, when mixing time is long, the additives contained in the aqueous liquid may decompose until supply of the granulated particle generated and the polymer gel together to the drying step, and could provide the case where sufficient amount of the additive cannot be present in the drying step. Further, continued mixing for a long time could incur performance decrease of the particulate water-absorbing agent, such as increase in water-soluble components or decrease in absorbency against pressure of the particulate water-absorbing agent obtained after completion of mixing.

[Two Lines for One Line of the Polymerization Step]

Explanation will be given below on a specific example where at least any one of the steps including and subsequent to the drying step is in two or more lines, for one line of the polymerization step, which is a characteristic of the production method of the present invention.

Figure 2:
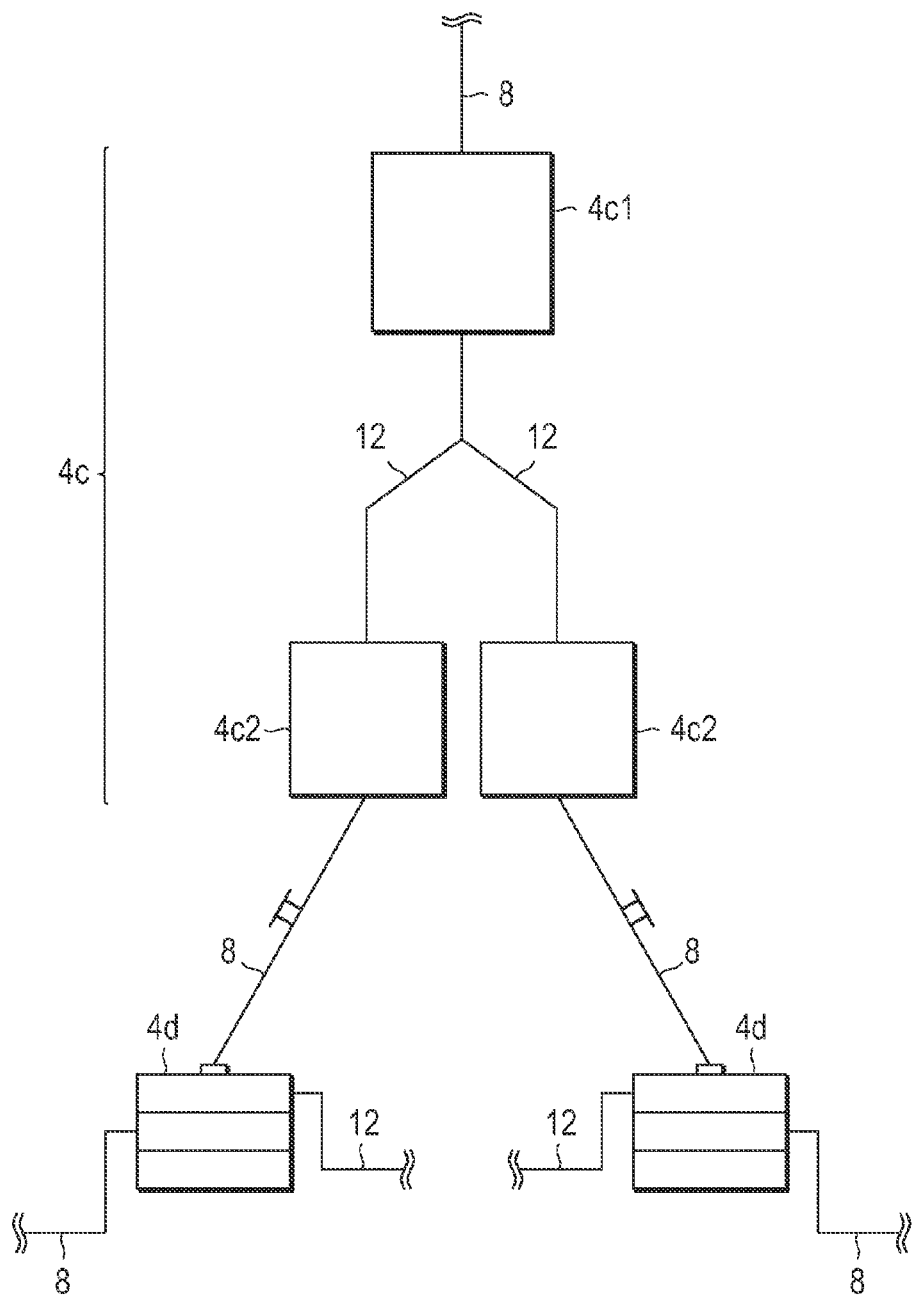
FIG. 2 is a drawing showing a schematic configuration of a pulverization apparatus and a classification apparatus contained in the production facility of FIG. 1.

FIG. 2 is a drawing showing an example of a schematic configuration of a pulverization apparatus 4c and a classification apparatus 4d contained in the production facility 2. In the pulverization apparatus 4c, rough pulverization is performed with a first pulverization apparatus 4c1, and then in a second pulverization apparatus 4c2, further fine pulverization is performed in two lines. The first pulverization apparatus 4c1 and the second pulverization apparatus 4c2 are connected so as to be branched by the pipeline 12 in the step. In this way, by performing pulverization in two lines, productivity is enhanced in a large degree. Further, the particulate water-absorbing resin passed through each pulverization apparatus is classified with two units of the classification apparatus 4d in two lines.

In the present embodiment, the two-stage pulverization steps are performed. To the first pulverization apparatus 4c1, a dried substance supplied to the drying step is transported. With this first pulverization apparatus 4c1, the first stage pulverization step is performed to obtain the first pulverized substance. This first pulverized substance is supplied to the second pulverization apparatus 4c2 via the pipeline inside the step 12. The second pulverization apparatus 4c2 is installed in two units. The pipeline 12 in the step is branched, and the first pulverized substance is supplied to each of the two units of the second pulverization apparatus 4c2 via the pipeline 12 in the step. With the second pulverization apparatus 4c2, the first pulverized substance is more finely pulverized to obtain the second pulverized substance. This second pulverized substance is supplied to the classification apparatus 4d. To the two units of the classification apparatus 4d, the second pulverized substance pulverized with two units of the second pulverization apparatus 4c2 is each supplied. Among the classified substance classified with the classification apparatus 4d, one having desired particle diameter is supplied to the surface cross-linking step. In addition, among the classified substance, one having too small particle diameter is supplied to the granulation step 4j as fine powders. Among the classified substance, one having too large particle diameter is supplied again to the first pulverization apparatus 4c1. As in the above embodiment, by passing preferably two to five stages of the pulverization steps, pulverization can be performed efficiently, and the pulverized substance with desired particle diameter is obtained. It should be noted that, in the present embodiment, both of the pulverization step and the classification step are two lines, for one line of the polymerization step, however, the pulverization step is branched from one line to two lines inside the step, while the classification step is in two lines from the beginning of the step. A concept of "the two or more lines" in the present invention encompasses any of these. That is, the case of being two or more lines by branching in the step as in the pulverization step of the present embodiment; and the case of being two lines from the beginning of the step as in the classification step of the present embodiment; are both included in the concept of "the two or more lines" in the present invention.

By being in two to ten lines for the pulverization step and the classification step, damage to the powders can be reduced and production efficiency can be maintained high, even when production amount is increased and thus load is increased. As a result, property (in particular, liquid permeation, absorbency against pressure to be described later) of the resultant particulate water-absorbing agent can be maintained. In addition, by being in two or more lines, compact sizing of an apparatus becomes possible. As a result, sieve mesh of the classification apparatus becomes difficult to be broken and thus durability is enhanced.

When classification is performed with one unit of the classification apparatus, increase in production amount results in increasing load to the classification apparatus. Therefore, in the present invention, by installing two units of compact-type classification apparatuses, enhancement of productivity can be attained, as well as property of the water-absorbing agent can be enhanced, as a final product. In the embodiment shown in FIG. 2, the water-absorbing resin is carried to a hopper (there is no figure) for performing further the storage step. The hopper, by being warmed, prevents aggregation of the water-absorbing resin stored. In this case, the water-absorbing resin passed through the branched line may also be in one line, for example, at the time when it is recovered in the storage step. And, the water-absorbing resin may proceed to the surface cross-linking step in a large scale apparatus in one line itself.

By returning to one line in the surface cross-linking step, the water-absorbing resin with stabilized property can be surface treated. And, in case of one line, the pipelines can be reduced, and enough plant design becomes unnecessary.

The above-described flow is one example, and depending on property required to the final particulate water-absorbing agent, by setting the step giving influence on property, in a plurality of lines as appropriate, reduction of adverse influence or further enhancement of water absorbing performance can be attained.

Figure 3:
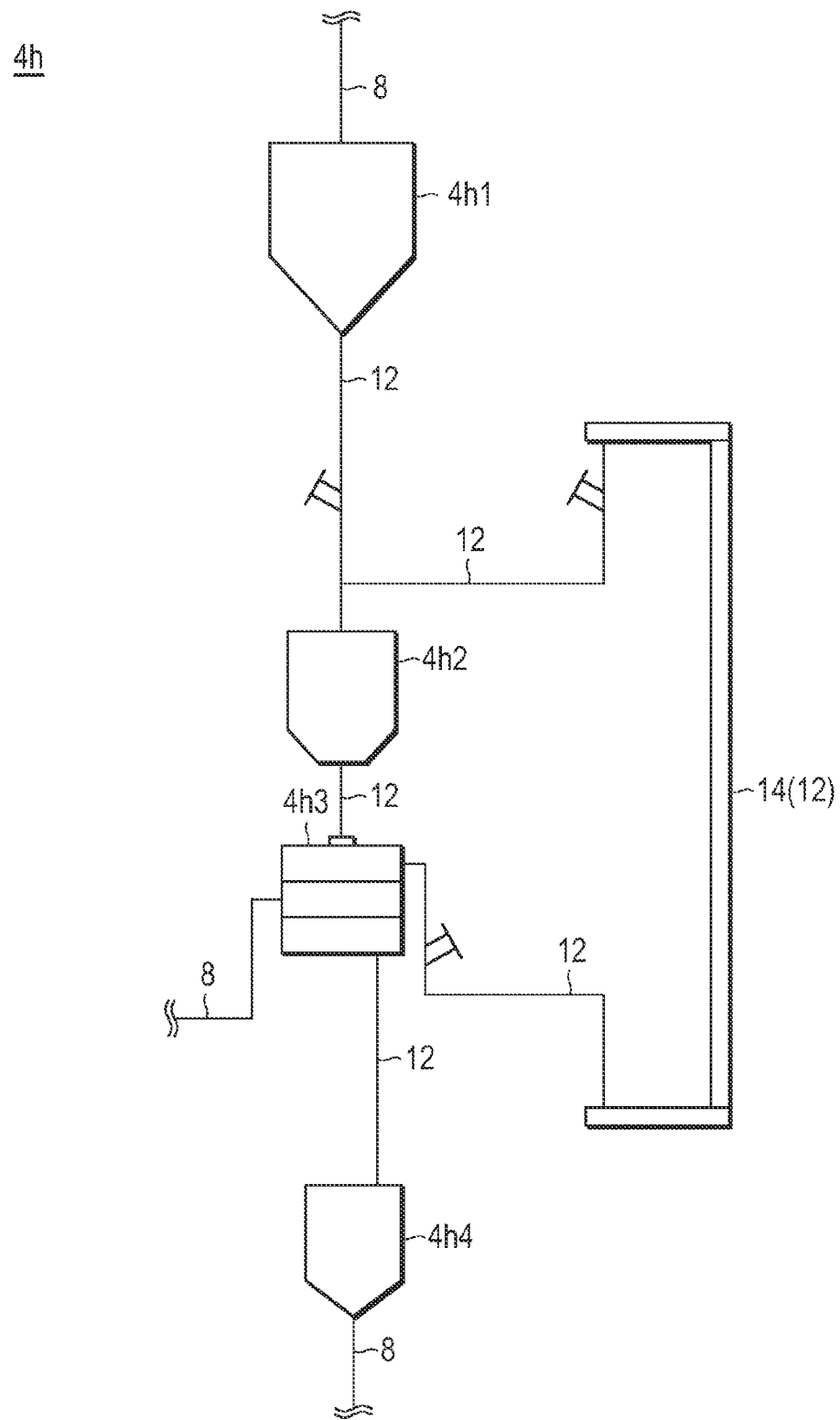
FIG. 3 is a drawing showing a schematic configuration of a granule sizing apparatus contained in the production facility of FIG. 1.

FIG. 3 is a drawing showing one example of a schematic configuration of a granule sizing apparatus $4h$ contained in the production facility 2. The granule sizing apparatus $4h$ has a hopper $4h1$, a pulverization machine $4h2$, a classification machine $4h3$, a hopper $4h4$, and a pipeline 12 in the step.

The particulate water-absorbing agent passed through the surface cross-linking step and cooling step is stored temporarily in the hopper $4h1$ (the storage step). Next, the particulate water-absorbing agent is sent from the hopper $4h1$ to the pulverization machine $4h2$. The hopper is warmed to prevent aggregation. The particulate water-absorbing agent pulverized by this pulverization machine $4h2$ is sent to the classification machine $4h3$. Among the classified substances by the classification machine $4h3$, one having a desired particle diameter is sent to the filling apparatus $4i$ installed downstream. In addition, among the classified substances, one having too small particle diameter is sent to the granulation step $4j$ via the hopper $4h4$, as the fine powders. Among the classified substances, one having too large particle diameter is transported again to the pulverization machine $4h2$. This transportation is performed by a conveyer 14. That is, the too large classified substance is returned from the classification apparatus $4h3$ to the pulverization machine $4h2$ via the conveyer 14. By including the granule sizing step including and subsequent to the surface cross-linking step, and by branching in two or more lines inside the granule sizing step, a particle diameter of the water-absorbing agent finally obtained can be a desired one, even when change of the particle diameter generates in surface cross-linking.

Usefulness of branching in multiple is as described before. Further, in the present invention, it has been discovered that in the production method for the particulate water-absorbing agent via many steps as in FIG. 1, by installing a branch cycle in multiple, enhancement and stabilization of water absorbing performance can be further promoted. Specifically, it is preferable that a cycle, where the step in one line branches to a plurality of lines and then it is in one line, is performed equal to or more than two times. Further preferably, it is equal to or more than three times, particularly preferably equal to or more than five times, and most preferably equal to or more than seven times. The upper limit is, in consideration of plant design, equal to or less than 20 times, preferably equal to or less than 15 times, and particularly preferably equal to or less than 12 times. Preferably, quantitative supply may be performed to one or more lines, by installing the hopper or the silo as appropriate in the midst of the branch, and by using a metering feeder from the hopper or the silo.

[A Division Method]

The present invention includes a division step, preferably the division step of the particulate water-containing gel or the particulate water-absorbing resin of a dried substance thereof, and more preferably the division step of the particulate water-absorbing resin.

As the division method to be used, for example, the following methods (a) to (c) are used for the particulate water-absorbing resin after drying.

(a) A method for dividing the particulate water-absorbing resin after storage in the hopper. Preferably, a metering feeder for powders is used. As the metering feeder, a circle feeder, a screw feeder or the like is used suitably.

(b) A method for dividing the particulate water-absorbing resin in transportation to a plurality of hoppers by pneumatic transportation.

(c) A method for dividing the particulate water-absorbing resin in falling (for example, free fall). In this case, a two divider, a three divider installed with crests or weirs or the like is used for dividing. It should be noted that, a JIS riffle sampler (a two divider) has a structure partitioned to many small compartments, where a charged sample is sorted in two directions alternately.

For example, the following (d) to (f) or a combination method thereof are used for the polymer gel after polymerization, and it is supplied to the drying step in parallel.

(d) A method for dividing the particulate water-containing gel obtained with a kneader or a meat chopper, in falling (for example, free fall). In dividing, a two divider or a three divider, installed with crests or weirs, is used at the exit of the kneader or the meat chopper.

(e) A method for dividing the particulate water-containing gel, with a metering feeder.

(f) A method for cutting a sheet-like gel obtained in belt polymerization.

Among these, it is preferable that at least the particulate water-absorbing resin after drying is divided, and in order to attain this, the polymer gel or the particulate dried substance is divided.

It should be noted that, preferable value of division ratio of the particulate water-absorbing resin or the polymer gel to be divided in the above-described embodiment is as described above.

Among these methods, in view of quantitative supplying performance, preferably the methods (a) to (c), and further the method (a) is used.

[The Particulate Water-Absorbing Agent of the Present Invention]

Weight average particle diameter (D50) specified by JIS standard sieve classification of the particulate water-absorbing agent obtained by the production method of the present invention, is preferably 200 to 800 µm, more preferably 200 to 450 µm, further preferably 220 to 430 µm, and particularly preferably 250 to 400 µm. In addition, the particulate water-absorbing agent of the present invention can exert particularly excellent effect, when it has specific particle diameter distribution. As for the preferable particle diameter distribution, ratio of particles occupying within the upper and the lower limit of 850 to 150 µm (specified by the JIS standard sieve; Z8801-1 (2000)), is preferably 90 to 100% by mass, further preferably 95 to 100% by mass, and particularly preferably from 98 to 100% by mass, relative to total of the water-absorbing agent. And, the ratio of the substance (the particulate water-absorbing agent (the fine powders) of equal to and less than 150 µm of particle diameter) passing 150 µm occupying in total mass of the water-absorbing agent is preferably below 5% by mass, further preferably below 1% by mass. The particle diameter distribution is preferably in a specific range. Logarithm standard deviation (σζ) thereof is set to preferably 0.20 to 0.50, and further preferably 0.30 to 0.40. When the weight average particle diameter (D50), the content rate of particles below 150 µm, and the logarithm standard deviation (σζ) of particle diameter distribution are outside the range, there may be the case where liquid permeability and water absorbing speed decrease. It should be noted that, the logarithm standard deviation of particle diameter distribution and the weight average particle diameter are specified by US-A-2006/0204755 specification.

It should be noted that, particle shape of the particulate water-absorbing agent or the particulate water-absorbing resin of the present invention is not especially limited. As this particle shape, spherical-shape, nearly spherical-shape, irregular crushed shape (which is a pulverized substance), bar shape, polygonal shape, sausage shape (for example; refer to U.S. Pat. No. 4,973,632 specification), a particle with wrinkles (for example; refer to U.S. Pat. No. 5,744,564 specification) or the like is included. The particle of the particulate water-absorbing agent or the particulate water-absorbing resin of the present invention may be a single particle, or granulated particle, or a mixture of the single particle and the granulated particle. In addition, the particle may be foamed porous one. Preferably, it is a single particle with irregular crushed shape or a granulated substance thereof.

In view of malodor and hygiene, amount of the residual monomer of the particulate water-absorbing agent is preferably 0 to 500 ppm, more preferably 0 to 400 ppm, more preferably 0 to 300 ppm, more preferably 0 to 250 ppm, more preferably 0 to 200 ppm, further preferably 0 to 150 ppm, and particularly preferably 0 to 100 ppm. When a principal component of the monomer used in the polymerization is acrylic acid and/or a salt thereof, it is preferable that content of the unreacted acrylic acid and/or the salt thereof is equal to or less than 500 ppm. In measurement of amount of the residual monomer, first, 0.5 g of the water-absorbing agent is added to 1000 g of deionized water in a plastic container having a cap, and stirred for 2 hours. After stirring, the swelled and gelled water-absorbing agent is filtered with a filter paper, and the filtrate is analyzed with liquid chromatography. On the other hand, solutions with known concentrations of the monomer (acrylic acid) are similarly analyzed, and the resultant calibration curve is used as an external standard. Based on this external standard, amount of the residual monomer is determined in consideration of dilution rate of a filtrate.

In the present production method, the productivity is enhanced. In addition, the property of the obtained water-absorbing agent is stabilized. The water-absorbing agent obtained by this production method is superior in property such as absorbency against non-pressure, absorbency against pressure, and liquid permeation.

Absorbency against non-pressure (CRC) of the particulate water-absorbing agent for a normal saline solution is preferably equal to or higher than 15 g/g. In general, when the particulate water-absorbing agent having the absorbency against non-pressure of below 15 g/g is used in absorbent articles such as disposable diapers, it could not provide high property. On the other hand, because the higher is the absorbency against non-pressure, the higher property of the absorbent articles is obtained, the upper limit thereof is not especially limited, however, in view of production difficulty as well as cost increase, it is thought that the upper limit of this absorbency against non-pressure is preferable to be equal to or lower than 60 g/g. This absorbency against non-pressure is more preferably 15 to 50 g/g, and particularly preferably 25 to 35 g/g.

Absorbency against non-pressure (CRC) for a normal saline solution can be obtained as follows. Firstly, 0.2 g of the particulate water-absorbing agent was weighed correctly (this weight becomes "mass of the particulate water-absorbing agent" of the following expression), which was put uniformly in a bag made of nonwoven fabric (60 mm×85 mm), and is immersed in a normal saline solution (about 200 g) with a temperature adjusted at 25±2° C. After 30 minutes, this bag was pulled up, and subjected to water draining for 3 minutes, using a centrifugal separation machine (a compact-type centrifugal separation machine, model-type: H-122, manufactured by Kokusan Co., Ltd.) under a condition of 250 G (250×9.81 m/s$^2$). Then, mass W4 (g) of the bag after performing the water draining was measured. In addition, similar operation was performed on the bag made of nonwoven fabric without containing the particulate water-absorbing agent, and mass W3 (g) of this bag was measured. Then absorbency against non-pressure was calculated according to the following expression, using these masses W4 and W3.

$$CRC(g/g)=[(W4-W3)/\text{mass of the particulate water-absorbing agent}]-1 \qquad \text{[Expression 1]}$$

The particulate water-absorbing agent obtained by the production method of the present invention has AAP (Absorbency against Pressure) for a normal saline solution under pressurization of 4.8 kPa, is preferably equal to or higher than 15 g/g, more preferably equal to or higher than 22 g/g, further preferably equal to or higher than 24 g/g and most preferably equal to or higher than 26 g/g. In general, when the particulate water-absorbing agent having the absorbency against pressure of below 15 g/g is used in absorbent articles such as disposable diapers, it could not provide high property. On the other hand, because the higher is the absorbency against pressure, the higher property of the absorbent articles is obtained, the upper limit thereof is not especially limited, however, in view of production difficulty as well as cost increase, it is thought that the upper limit of the absorbency against pressure is preferably equal to or lower than 35 g/g.

The absorbency against pressure (AAP) can be obtained in accordance with a method described in U.S. Pat. No. 6,071,976. In more detail, absorbency against pressure (value at 60 minute) for a normal saline solution under 50 g/cm² (4.8 kPa), has been measured. This measurement is performed under an environment of 23±2° C.

Absorbency against pressure for a normal saline solution under pressurization of 4.8 kPa can be obtained as follows. Firstly, a supporting cylinder made of plastic, having an inner diameter of 60 mm, having a metal mesh with a sieve mesh size of 400 μm (a sieve mesh size of 38 μm) made of stainless steel welded at the bottom thereof, was prepared. Then, 0.900 g of the water-absorbing agent was spread uniformly on this metal mesh, and a piston (cover plate), having an outer diameter of a little smaller than 60 mm, no clearance between the wall surface of the supporting cylinder and itself, and being able to slide up and down, is mounted on the metal mesh. Next, mass $W6$ (g) of the supporting cylinder, the particulate water-absorbing agent and the piston was measured. Then, by mounting a weight on this piston, it was adjusted so that a pressure of 4.8 kPa was uniformly loaded to the water-absorbing agent. Such an adjusted state is a measurement machine of this absorbency against pressure. Next, inside a Petri dish with a diameter of 150 mm, a glass filter with a diameter of 90 mm, and a thickness of 5 mm was put, and a normal saline solution, whose temperature was adjusted to 25±2° C., is poured, so as to become the same level as the upper surface of the glass filter. On the upper surface of this glass filter, a sheet of a filter paper (No. 2, manufactured by Tohyo Filter Paper Co., Ltd.) with a diameter of 9 cm was put, so that whole surface was wet, and then excess saline solution was removed. Next, the measurement machine is put on the filter paper and the normal saline solution is absorbed under pressure. When water surface of the saline solution became lower than the upper surface of the glass filter, the saline solution was replenished to maintain the water surface level constant. After one hour, the measurement machine was picked out to measure mass $W5$ (g) excluding the weight. This mass $W5$ (g) is the total mass of the supporting cylinder, the swollen water-absorbing agent and the piston. Then absorbency against pressure under pressurization of 4.8 kPa was calculated according to the following expression, using these masses $W5$ and $W6$. It should be noted that, Ws in the expression represents mass of the water-absorbing agent.

$$AAP4.8\ kPa(g/g)=(W6-W5)/Ws \qquad \text{[Expression 2]}$$

Absorbent articles, which are made using the particulate water-absorbing agent obtained by the production method of the present invention, can be obtained, for example, by forming the particulate water-absorbing agent and, as needed, a hydrophilic fiber in a sheet-like shape. When the hydrophilic fiber is not used, the absorbent articles can be obtained by fixing the particulate water-absorbing agent in paper or non-woven fabric. Content (core concentration) of the particulate water-absorbing agent in such absorbent articles is, for example, 10 to 100% by weight, preferably 30 to 100% by weight, and more preferably 50 to 100% by weight. In addition, it is desirable that the absorbent articles are adjusted to have a density in a range of 0.06 to 0.5 g/cc, and a basis weight is in a range of 0.01 to 0.2 g/cm². It should be noted that, as a fiber substrate to be used, for example, hydrophilic fiber such as pulverized wood pulp, cotton linter or cross-linked cellulose fiber, rayon, cotton, wool, acetate fiber, vinylon fiber may be exemplified, and the airlaid one is also preferable.

Amount of the fine powders contained in the particulate water-absorbing agent obtained by the production method of the present invention is low. In such a particulate water-absorbing agent, obstruction of liquid permeation caused by the fine powders is suppressed. Such a particulate water-absorbing agent is superior in liquid permeation. Therefore, the production method of the present invention is desirable as a production method for the particulate water-absorbing agent for which required, in particular, high liquid permeation (SFC).

Liquid permeation (SFC) of the particulate water-absorbing agent obtainable by the production method of the present invention is a value showing the particulate water-absorbing agent or liquid permeation in swelling of the water-absorbing agent. The larger is the value of this liquid permeation (SFC), the particulate water-absorbing agent shows to have the higher liquid permeation. By removal of the fine powders, value of liquid permeation (SFC) can be increased. This liquid permeation (SFC) is preferably equal to or higher than 30 ($\times 10^{-7}\cdot cm^3 \cdot s \cdot g^{-1}$), more preferably equal to or higher than 60 ($\times 10^{-7}\cdot cm^3 \cdot s \cdot g^{-1}$), further preferably equal to or higher than 100 ($\times 10^{-7}\cdot cm^3 \cdot s \cdot g^{-1}$). When liquid permeation (SFC) is below 30 ($\times 10^{-7}\cdot cm^3 \cdot s \cdot g^{-1}$), in the case where concentration of the particulate water-absorbing agent in the absorbent articles such as disposable diapers is equal to or higher than 30% by mass, in more specifically, in the case of equal to or higher than 50% by mass, absorption speed of urine decreases, which could incur leakage. In the present application, this liquid permeation (SFC) is also called saline flow conductivity.

In measurement of saline flow conductivity (SFC), 0.900 g of the water-absorbing agent is put uniformly in a container. This water-absorbing agent is pressurized at 2.07 kPa, while being immersed into artificial urine. After 60 minutes, height of the swollen water-absorbing agent (gel layer) is recorded. In a state that the water-absorbing agent is pressurized at 2.07 kPa, a 0.69% by mass normal saline solution is passed through the gel layer. In this case, room temperature is adjusted at 20 to 25° C. Using a computer and a balance, fluid amount passing through the gel layer is recorded in an interval of 20 seconds to calculate flow velocity Fs (T) of the fluid passing. Flow velocity Fs (T) is calculated by dividing increased mass (g) by increased time (s). Time when hydrostatic pressure of the saline solution became constant and stable flow velocity is obtained, is adopted as Ts, and only data measured for 10 minutes from the Ts is used in flow velocity calculation. From flow velocity measured for 10 minutes from the Ts, value of Fs (T=0) is obtained. This value is initial flow velocity for passing through the gel layer. Fs (T) is plotted against time, and Fs (T=0) is calculated relative to result obtained by the least square method. Saline flow conductivity (SFC) is calculated by the following expression.

$$SFC=(Fs(t=0)\cdot L0)/(\rho\cdot A\cdot \Delta P) \qquad \text{[Expression 3]}$$

In this expression, L0 is height (cm) of the gel layer, ρ is density (g/cm³) of the saline solution, A is cross-sectional area A (cm²) of the gel layer and ΔP is hydrostatic pressure (dyne/cm²) loaded on the gel layer. The artificial urine is obtained by mixing 0.25 g of a dihydrate of calcium chloride, 2.0 g of potassium chloride, 0.50 g of a hexa hydrate of magnesium chloride, 2.0 g of sodium sulfate, 0.85 g of ammonium dihydrogen phosphate, 0.15 g of diammonium hydrogen phosphate, and 994.25 g of pure water. Such an evaluation is performed in accordance with the SFC test described in U.S. Pat. No. 5,849,405 specification.

In addition, in the present invention, on the assumption of a large scale continuous production, where damage is loaded onto the water-absorbing resin powders, the following paint shaker test was adopted.

The paint shaker test (PS) is performed as follows: 10 g of glass beads with a diameter of 6 mm, and 30 g of the water-absorbing resin or the water-absorbing agent are charged into a glass container with diameter of 6 cm and a height of 11 cm, which container was attached to a paint shaker (a product No. 488, manufactured by Toyoseiki Seisaku-Sho Ltd.) to shake under 800 cycle/min (CPM): and the details of the machine has been disclosed in JP-A-H9-235378. It should be noted that, description of P/S 30 indicates a shaking time of 30 minutes. After the shaking, the glass beads are removed with a JIS standard sieve having a sieve mesh size of 2 mm to obtain the water-absorbing resin or the water-absorbing agent given damage.

[Production Amount by the Production Method of the Present Invention]

The production method for the present invention can produce the particulate water-absorbing agent continuously and stably, by branching so that at least any one of the steps including and subsequent to the drying step is in two or more lines, for one line of the polymerization step, even when production amount is increased and thus load becomes excessive. Such a production method can contribute to stabilization of water absorbing characteristics of a product obtained continuously, in a production scale of preferably equal to or higher than 500 kg/h, further preferably equal to or higher than 1000 kg/h, and particularly preferably equal to or higher than 1500 kg/h, (the upper limit is, for example, 10000 kg/h). This production method can become more effective, by branching the pulverization step and the classification step in two or more lines, for one line from the polymerization step to the pulverization step, and preferably by returning in one line in the surface cross-linking step. This production method can become further effective, by performing, two or more times in total, a cycle where the step in one line branches to a plurality of lines and then it is in one line. The production method for the present invention is effective in a large scale continuous production, because of providing high quality of the resultant product and having small change with time.

Each of the steps may be performed in batch-type by the same or different apparatus, however, preferably continuous production is performed by connecting each of the steps. Treatment time in each of the steps is determined as appropriate. Treatment time of each of the steps is, for example, as follows. Treatment time of the polymerization step is, for example, from 0.1 minute to 10 hours, and preferably from 1 minute to 1 hour. Treatment time of the drying step is, for example, from 0.1 minute to 10 hours, and preferably from 1 minute to 1 hour. Treatment time of the pulverization step is, for example, from 0.01 second to 1 hour, and preferably from 0.1 second to 0.5 hour. Treatment time of the classification step is, for example, from 0.01 second to 1 hour, and preferably from 0.1 second to 0.5 hour. Treatment time of the transportation step (when the transportation step is performed in multiple, time of each step) is, for example, from 0.01 second to 1 hour, and preferably from 0.1 second to 0.5 hour. Treatment time of the surface cross-linking step is, for example, from 0.1 minute to 5 hours, and preferably from 1 minute to 1 hour. Treatment time of the cooling step is, for example, from 0 to 2 hours, and preferably from 0.1 hour to 1 hour. Treatment time of the granule sizing step is, for example, from 0 to 2 hours, and preferably from 0.1 to 1 hour.

In view of attaining enhancement of property such as liquid permeation or the like, a preferable embodiment of the production method for the present invention essentially includes the polymerization step for obtaining the polymer gel by polymerization of a monomer, the drying step for drying the polymer gel to obtain a dried substance, the pulverization step for pulverizing the dried substance, the classification step for sieving the particulate water-absorbing resin, the surface cross-linking step for cross-linking the neighborhood of the surface of the particulate water-absorbing resin, the packaging step for filling the particulate water-absorbing agent into a packaging material container for packaging, and the transportation step for transporting the products produced in each of the steps to other steps, and further includes 0 to 2 steps selected from a group consisting of the cooling step for cooling the particulate water-absorbing agent obtained after the surface cross-linking step and the granule sizing step for granule sizing the particulate water-absorbing agent. Preferably, this production method includes at least one of the cooling step and the granule sizing step, and further includes both.

In view of suppressing humidity absorption or dew condensation inside the step, in the inside of at least one step, preferable air temperature Ta inside the relevant step is set equal to or higher than 25° C., more preferably equal to or higher than 30° C., further preferably equal to or higher than 40° C., and particularly preferably equal to or higher than 50° C. Because the too high air temperature Ta in the step may provide the case, where property of the particulate water-absorbing agent decreases rather, this temperature Ta is preferably equal to or lowers than 150° C. In view of production stability, it is particularly preferable that a preferable embodiment of the temperature Ta is adopted in the pulverization step, the classification step, the granule sizing step and the storage step. When humidity absorption or dew condensation generated in these steps, stable production may be obstructed easily. In addition, because a storage part such as a hopper, where a plurality of lines are put together, stores a large quantity of the particulate water-absorbing resin for a relatively long period, absorption of humidity tends to generate. Further, when aggregation generated in the storage part such as a hopper, discharge of the particulate water-absorbing resin from a discharge port of the storage part becomes difficult, therefore stable production tends to be obstructed. From this viewpoint, it is preferable that inner air of the storage parts present in the production facility is warmed at preferably 40 to 150° C., and further preferably 50 to 100° C. In addition, when aggregation generated in the pipeline, clogging of the pipeline tends to generate, therefore stable production tends to be obstructed. It is preferable that a heating member is arranged at the outside of the hopper or pipeline or the like, to heat inner air of the storage part (hopper) or the pipeline. As this heating member, an electric heater such as a band heater, a pipe or a jacket or the like, which enables to pass through high temperature steam or heated liquid, can be adopted. In view of easy handling, the liquid is preferably water. In view of heat conductivity, it is preferable that a material of the heating member (a pipe or the like) is preferably a metal, and more preferably copper or a copper-type alloy. It is preferable that this heating member is wound at the outer surface of the storage part such as the hopper or the like.

EXAMPLES

Effect of the present invention will be clarified below with reference to Examples, however, the present invention should not be construed restrictive, based on description of these Examples. It should be noted that, in the present description, "parts by mass" and "% by mass" are synonymous to "parts by weight" and "% by weight", respectively.

Example 1

Using the production facility shown in FIG. 1, FIG. 2 and FIG. 3, the particulate water-absorbing agent (150000 kg)

was produced continuously. This production facility has capability of producing the particulate water-absorbing agent in 1500 kg/hr.

Firstly, the fine-powder capturing apparatus 6 and the granulation apparatus 4j were connected by the pipeline 8b. Then, the granulation apparatus 4j was connected to the pipeline 8 which connects the polymerization apparatus 4a and the drying apparatus 4b. In this way, the fine powders were collected with the fine-powder capturing apparatus 6 through the pipeline 8a (the collection step). The fine powders thus collected were charged into the granulation apparatus 4j through the pipeline 8b. In this production apparatus, the classification apparatus 4d and the granulation apparatus 4j were connected by the pipeline 8, and the fine powders classified with the classification apparatus 4d were charged into the granulation apparatus 4j via this pipeline and the hopper warmed. In addition, the granule sizing apparatus 4h and the granulation apparatus 4j are connected by the pipeline 8, and the fine powders sorted with the granule sizing apparatus 4h were charged into the granulation apparatus 4j via this pipeline and the hopper warmed. The granulated particle obtained from the fine powders with this granulation apparatus 4j was charged into the drying step 4b.

In this Example 1, firstly an aqueous solution containing a partial sodium salt of acrylic acid with 75% by mole neutralized, as a monomer, and polyethylene glycol diacrylate (average number of n=9), as an inner cross-linking agent, was prepared as a monomer solution (a monomer aqueous solution (1)). It should be noted that, the "average number of n" means average number of polymerization degree of ethylene oxide in the polyethylene glycol chain. In this monomer solution, monomer concentration was adjusted to 38% by mass. Concentration of the inner cross-linking agent was adjusted to 0.06% by mole, based on the monomer. Next, while this monomer solution was fed continuously with a metering pump, by blowing nitrogen gas continuously, oxygen concentration of this monomer solution was adjusted to equal to or lower than 0.5 ppm. Next, to the monomer solution, sodium persulfate and L-ascorbic acid were mixed with a line mixer, so that mass ratio of sodium persulfate/L-ascorbic acid became 0.14/0.005, relative to 1 mole of the monomer. Next, the monomer solution was supplied to a flat surface steel belt having weirs at both sides thereof, so that thickness thereof became about 25 mm, to perform aqueous solution polymerization for 30 minutes and to obtain polymer gel in a water-containing state. Next, this polymer gel was crushed, and further this crushed polymer gel was segmentalized to about 1 mm using a meat chopper with a pore diameter of 7 mm (the polymerization step). This was spread thinly and mounted on the porous plate of a band dryer, to be subjected to hot air drying at 180° C. for 30 minutes, to obtain the particulate water-absorbing resin as a dried substance of the polymer gel (the drying step). Next, this dried substance was pulverized to obtain a particulate dried substance. Whole mass of this particulate dried substance was continuously supplied to a three-stage roll mill of the pulverization apparatus 4c (roll gap configuration: from the top, 1.0 mm/0.55 mm/0.42 mm) to be further pulverized (the pulverization step). It should be noted that, as the pulverization apparatus 4c, in detail, the three-stage roll mill was configured by the first pulverization apparatus 4c1 and the second pulverization apparatus 4c2 (the pulverization step: two lines) branched in two lines, shown in FIG. 2. Subsequently, it was classified by connecting a classification apparatus having a metal mesh with a sieve mesh size of 850 μm, and a metal mesh with a sieve mesh size of 150 μm for each line (the classification step; two lines) to obtain the particulate water-absorbing resin. About 98% by mass of this particulate water-absorbing resin was the particulate water-absorbing resin with particle diameter thereof of 150 to 850 μm. It should be noted that, absorbency against non-pressure (CRC) of this particulate water-absorbing resin was 35 g/g. Next, a surface preparation agent solution was prepared. This surface preparation agent solution was consisted of 1,4-butanediol, propylene glycol and pure water, and 1,4-butanediol, propylene glycol and pure water were adjusted to be 0.30 part by mass, 0.50 part by mass and 2.70 part by mass, respectively, relative to 100 parts by mass of the particulate water-absorbing resin. Next, this particulate water-absorbing resin was continuously supplied in 1000 kg/hr to a one line of a high speed continuous mixing machine (Turbulizer/1000 rpm), and the surface preparation agent solution was sprayed with a sprayer to mix this surface preparation agent solution and the particulate water-absorbing resin. Next, the particulate water-absorbing resin mixed with this surface preparation agent solution was cooled to 60° C. (the cooling step), (after the surface cross-linking step). After cooling, it was classified using the metal mesh with a sieve mesh size of 850 μm, and the metal mesh with a sieve mesh size of 150 μm to obtain the particulate water-absorbing agent (1) as a product having a particle diameter of 150 to 850 μm (the granule sizing step). A configuration of the granule sizing apparatus 4h, which performed the granule sizing step, is as shown in FIG. 3. Then this particulate water-absorbing agent (1) was filled in a packaging material container for packaging (the packaging step).

Example 2

The particulate water-absorbing agent (2) was produced similarly as in Example 1, except that 1% by mass of a 50% aqueous solution of aluminum sulfate was added, based on the water-absorbing resin, in the cooling step.

Comparative Example 1

The comparative particulate water-absorbing agent (1) was produced similarly as in Example 1, except that the pulverization step and the classification step were changed in one line.

Comparative Example 2

The comparative particulate water-absorbing agent (3) was produced by performing similarly pulverization, classification and surface cross-linking, except that polymerization was in two lines (belt polymerization machine in parallel), and further the latter half was in one line, according to the Patent Document 5 (WO2007/23097 pamphlet), in Comparative Example 1.

Example 3

The particulate water-absorbing agent (3) was produced similarly as in Example 1, except that the pulverization step and the classification step were changed in one line, and the surface cross-linking step and the cooling step were set in two lines.

That is, the particulate water-absorbing resin was obtained by the pulverization step of one line and the classification step of one line, after obtaining a dried substance of the polymer gel, by a similar method as in Example 1. About 98% by mass of this particulate water-absorbing resin was the particulate water-absorbing resin with a particle diameter of 150 to 850

μm. It should be noted that, absorbency against non-pressure (CRC) of this particulate water-absorbing resin was 35 g/g.

Next, a surface preparation agent solution similar to in Example 1 was prepared, and this particulate water-absorbing resin was continuously supplied in 500 kg/hr to a two line high speed continuous mixing machine (Turbulizer/1000 rpm) using a metering feeder, after storing in the hopper, and the surface preparation agent solution was sprayed with a sprayer to mix this surface preparation agent solution and the particulate water-absorbing resin (the mixing step; two lines). Next, the particulate water-absorbing resin mixed with this surface preparation agent solution was heated for 40 minutes with a two line paddle dryer adjusted at 200° C. (the surface cross-linking step; two lines), and then cooled to 60° C. with a two line cooling machine (the cooling step; two lines).

After cooling, it was stored temporarily in a one line hopper, and classified using the metal mesh with a sieve mesh size of 850 μm, and the metal mesh with a sieve mesh size of 150 μm to obtain the particulate water-absorbing agent (3) as a product having a particle diameter of 150 to 850 μm (the granule sizing step). A configuration of the granule sizing apparatus 4h was as shown in FIG. 3. Then, this particulate water-absorbing agent (3) was filled in a packaging material container for packaging (the packaging step).

Example 4

The particulate water-absorbing agent (4) was produced similarly, except that the surface cross-linking step and the cooling step were set in two lines, by storing once the particulate water-absorbing resin powders after classification, in a hopper, in Example 1 where the pulverization step and the classification step were in two lines, and further by continuous supply to a high speed continuous mixing machine in two lines, using a metering feeder similarly as in Example 3.

Example 5

The particulate water-absorbing agent (5) was produced similarly, except that the surface cross-linking step and the cooling step were set in two lines, by continuous supply to a high speed continuous mixing machine in two lines, using a two divider (JIS riffle sampler), and without using the hopper in Example 4.

Example 6

The particulate water-absorbing agent (6), as a substance passing 850 μm, was produced by performing surface cross-linking similarly by further adding 0.5 parts by weight of aluminum sulfate-octadeca hydrate to a surface preparation agent in Example 4, and further using only a metal mesh with a sieve mesh size of 850 μm.

Comparative Example 3

The comparative particulate water-absorbing agent (3), as a substance passing 850 μm, was produced by performing surface cross-linking similarly by further adding 0.5 parts by weight of aluminum sulfate-octadeca hydrate to a surface preparation agent in Comparative Example 1, and further using only a metal mesh with a sieve mesh size of 850 μm.

[Performance Evaluation of the Particulate Water-Absorbing Agent]

On the particulate water-absorbing agents (1) to (6), and the comparative particulate water-absorbing agents (1) to (3), values of absorbency against non-pressure (CRC), absorbency against pressure (AAP) and saline flow conductivity (SFC) were measured. Measurement methods for absorbency against non-pressure (CRC), absorbency against pressure (AAP) and saline flow conductivity (SFC) were as described above. Results thereof are shown in the following Table 1.

TABLE 1

| | Example 1 | Example 2 | Com. Exp. 1 | Com. Exp. 2 | Example 3 | Example 4 | Example 5 | Example 6 | Com. Exp. 3 |
|---|---|---|---|---|---|---|---|---|---|
| Polymerization machine (unit) | 1 | 1 | 1 | 2 | 1 | 1 | 1 | 1 | 1 |
| Pulv. Class. (unit) | 2 | 2 | 1 | 1 | 1 | 2 | 2 | 2 | 1 |
| Surf.corss-link. (unit) | 1 | 1 (note) | 1 | 1 | 2 | 2 (note) | 2 (note) | 2 | 1 |
| CRC g/g | 30.5 | 30.5 | 30.5 | 30.3 | 30.5 | 30.5 | 30.5 | 30.3 | 29.6 |
| AAP g/g | 25.1 | 24.3 | 24.9 | 24.9 | 25 | 25.6 | 25.1 | 24.3 | 23.6 |
| SFC $cm^3 \cdot s \cdot g^{-1}$ | $32 \times 10^{-7}$ | $53 \times 10^{-7}$ | $27 \times 10^{-7}$ | $28 \times 10^{-7}$ | $33 \times 10^{-7}$ | $40 \times 10^{-7}$ | $31 \times 10^{-7}$ | $50 \times 10^{-7}$ | $29 \times 10^{-7}$ |
| (Note) | | addition of Al to Example 1 | | | | with a hopper | without a hopper | | |

As shown in Table 1, Example 1 is superior in absorbency against pressure (AAP) and saline flow conductivity (SFC) as compared with Comparative Example 1. Example 2 is superior in saline flow conductivity (SFC) as compared with Comparative Example 1. In addition, Example 1 is superior in AAP/SFC as compared with Comparative Example 2 in accordance with Patent Document 5 (a polymerization apparatus in parallel). Further, as is understood by comparison between Comparative Example 3 and Example 6, by surface cross-linking, effect of the present invention is expressed more significantly, as well as there was no problem of yield decrease accompanied with removal of the fine powders.

In addition, in the continuous production in 150000 kg/hr, not only property enhancement of the resultant water-absorbing agent, but also decease by half in standard deviation (n=150) of absorbency against non-pressure (CRC), absorbency against pressure (AAP) and saline flow conductivity (SFC), and small deflection of property value were attained. For example, standard deviation of absorbency against pressure (AAP) became 0.23 in Example 6, as compared with 0.62 in Comparative Example 3.

That is, according to the present invention, it becomes possible to enhance and further stabilize property of the resultant particulate water-absorbing agent by setting, for one line of the polymerization step, at least one step including and subsequent to the polymerization step (in the present invention, the pulverization step, the classification step, the surface cross-linking step or the like) in two or more lines. Such enhancement of property of the particulate water-absorbing agent brings about large effect, in particular, in a large scale continuous production of the water-absorbing agent, as well as in a product with high liquid permeation (SFC).

INDUSTRIAL APPLICABILITY

The production method for the particulate water-absorbing agent of the present invention can be applied suitably, for example, for producing absorbing goods such as hygiene materials containing absorbing bodies such as disposable diapers, sanitary napkins, incontinent pads and the like.

The invention claimed is:

1. A method for producing a particulate water-absorbing agent comprising:
    a polymerization step for polymerizing a monomer to obtain a polymer gel;
    a drying step for drying the polymer gel to obtain a particulate water-absorbing resin;
    a pulverization step for pulverizing the particulate water-absorbing resin;
    a classification step for sieving the particulate water-absorbing resin;
    a surface cross-linking step for cross-linking the neighborhood of the surface of the particulate water-absorbing resin to obtain a particulate water-absorbing agent;
    a packaging step for filling the particulate water-absorbing agent into a packaging material container for packaging; and
    a transportation step for transporting the products produced in each of the steps to the other steps;
    wherein at least any one of the steps including and subsequent to the drying step is in two or more lines for one line of the polymerization step, in which two or more units of the same apparatus are installed in parallel for one unit of a polymerization apparatus.

2. The method for producing the particulate water-absorbing agent according to claim 1, wherein the pulverization step is in two or more lines, for one line of the polymerization step.

3. The method for producing the particulate water-absorbing agent according to claim 1, wherein the classification step is in two or more lines, for one line of the polymerization step.

4. The method for producing the particulate water-absorbing agent according to claim 1, wherein the steps from the polymerization step to before the pulverization step are in one line, while the pulverization step and the classification step are in two or more lines, for the one line.

5. The method for producing the particulate water-absorbing agent according to claim 1, further comprising a storing step, wherein the water-absorbing resin via the branched plural lines is collected in the storing step to become in one line.

6. The method for producing the particulate water-absorbing agent according to claim 5, wherein the storing step is performed at a temperature in the range of 40 to 150° C.

7. The method for producing the particulate water-absorbing agent according to claim 1, wherein two or more cycles are performed, where a step in one line is branched to plural lines and then becomes in one line.

8. The method for producing the particulate water-absorbing agent according to claim 1, wherein the production amount of the particulate water-absorbing agent is equal to or more than 500 kg/h.

9. The method for producing the particulate water-absorbing agent according to claim 1, wherein the surface cross-linking step is in two or more lines, for one line of the polymerization step.

10. The method for producing the particulate water-absorbing agent according to claim 1, wherein all of the pulverization step, the classification step and the surface cross-linking step are in two or more lines, for one line of the polymerization step.

11. The method for producing the particulate water-absorbing agent according to claim 1, comprising a division step of the particulate water-absorbing resin.

12. The method for producing the particulate water-absorbing agent according to claim 1, comprising a division step for dividing the particulate water-absorbing resin to two portions in a ratio of 6:4 to 4:6.

13. The method for producing the particulate water-absorbing agent according to claim 1, wherein the particulate water-absorbing resin is divided after storage into a hopper.

14. The method for producing the particulate water-absorbing agent according to claim 1, wherein the particulate water-absorbing resin is divided in free fall.

15. The method for producing the particulate water-absorbing agent according to claim 1, wherein the particulate water-absorbing resin is divided in transporting to a plurality of hoppers by pneumatic transportation.

16. The method for producing the particulate water-absorbing agent according to claim 1, comprising a division step for dividing the polymer gel obtained in the polymerization step to two portions in a ratio of 6:4 to 4:6.

17. The method for producing the particulate water-absorbing agent according to claim 1, wherein the polymer gel obtained in the polymerization step is dried after being divided to two portions in free fall or by a feeder.

18. The method for producing the particulate water-absorbing agent according to claim 1, wherein the particle of the particulate water-absorbing resin is an irregular crushed particle, and said particulate water-absorbing resin is a polyacrylic acid (salt)-based water-absorbing resin.

19. The method for producing the particulate water-absorbing agent according to claim 1, wherein continuous kneader polymerization or continuous belt polymerization is performed in the polymerization step.

20. The method for producing the particulate water-absorbing agent according to claim 1, wherein the surface cross-linking step is performed using a surface cross-linking agent having dehydration esterification reactivity, of one or more kinds selected from an oxazolidinone compound, an alkylene carbonate compound, a polyvalent alcohol compound, and an oxetane compound, at a temperature in the range of 150 to 250° C.

21. The method for producing the particulate water-absorbing agent according to claim 1, wherein the particulate water-absorbing agent has properties of CRC: 10 to 100 g/g, AAP: 15 to 50 g/g, SFC: equal to or higher than 1 (unit: $10^{-7} \cdot cm^3 \cdot s \cdot g^{-1}$), and the amount of fine powders with a particle diameter of below 150 μm: 0 to 5% by mass.

* * * * *